United States Patent
Reeh et al.

(10) Patent No.: US 10,543,893 B2
(45) Date of Patent: Jan. 28, 2020

(54) UNDERSEA VEHICLE AND METHOD FOR OPERATING A REACTOR

(71) Applicant: Lynntech, Inc., College Station, TX (US)

(72) Inventors: Jonathan Reeh, College Station, TX (US); Jady Stevens, Bryan, TX (US); Tiffany Jefferson, Bryan, TX (US); Justin McIntire, Bryan, TX (US); Chris Hadley, Bryan, TX (US); John Zbranek, College Station, TX (US); Jeffrey S. Parkey, College Station, TX (US); Ashwin Kumar Balasubramanian, College Station, TX (US); Jibi Varughese, College Station, TX (US); Geoffrey D. Hitchens, Allen, TX (US); Marc W. Penny, Bryan, TX (US)

(73) Assignee: Lynntech, Inc., College Station, TX (US)

( * ) Notice: Subject to any disclaimer, the term of this patent is extended or adjusted under 35 U.S.C. 154(b) by 0 days.

(21) Appl. No.: 15/983,384

(22) Filed: May 18, 2018

(65) Prior Publication Data

US 2018/0339757 A1 Nov. 29, 2018

Related U.S. Application Data

(60) Provisional application No. 62/511,817, filed on May 26, 2017.

(51) Int. Cl.
*B63G 8/08* (2006.01)
*H01M 8/04082* (2016.01)
(Continued)

(52) U.S. Cl.
CPC .............. *B63G 8/08* (2013.01); *B63H 21/00* (2013.01); *C01B 3/065* (2013.01);
(Continued)

(58) Field of Classification Search
CPC .......... B63G 8/08; B63H 21/00; C01B 3/065; C01B 3/50; H01M 8/04007;
(Continued)

(56) References Cited

U.S. PATENT DOCUMENTS 3,328,957 A * 7/1967 Rose ..................... B63G 8/10
60/39.461
3,372,996 A * 3/1968 Barrett .................... B01J 7/02
102/531

(Continued)

OTHER PUBLICATIONS

Eagle et. al. "System Modeling of a Novel Aluminum Fueled UUV Power System" 50th AIAA Aerospace Meeting including the New Horizons Forum and Aerospace Exposition Jan. 9-12, 2012 Nashville, Tennessee, 15 pages, https://deepblue.lib.umich.edu/bitstream/handle/2027.42/9, last accessed Jun. 6, 2019 (Year: 2012).*

(Continued)

*Primary Examiner* — Behrang Badii
*Assistant Examiner* — Daniel L Greene
(74) *Attorney, Agent, or Firm* — Edwin S. Flores; Chalker Flores, LLP

(57) ABSTRACT

The present invention includes an underwater vehicle power unit and method of operating the same comprising: a fuel and waste stack comprising one or more reactant or fuel storage bladders and one or more waste storage bladders; a heater; a reactor that generates hydrogen and waste; a hydrogen and waste separator; a back-pressure regulator; a hydrogen and liquid separator; a fuel cell; and a controller that controls the temperature of the heater, the flow of fuel into the reactor, the flow of hydrogen into the fuel cell, the (Continued)

flow of water that dilutes the fuel, the flow of waste from the reactor and/or the fuel cell into the one or more waste storage bladders.

26 Claims, 16 Drawing Sheets

(51) Int. Cl.
| | |
|---|---|
| *H01M 8/065* | (2016.01) |
| *H01M 8/04746* | (2016.01) |
| *H01M 8/04007* | (2016.01) |
| *H01M 8/04119* | (2016.01) |
| *C01B 3/06* | (2006.01) |
| *B63H 21/00* | (2006.01) |
| *H01M 8/04029* | (2016.01) |
| *B63H 21/38* | (2006.01) |
| *B63J 4/00* | (2006.01) |

(52) U.S. Cl.
CPC ... *H01M 8/04007* (2013.01); *H01M 8/04141* (2013.01); *H01M 8/04216* (2013.01); *H01M 8/04753* (2013.01); *H01M 8/04761* (2013.01); *H01M 8/04776* (2013.01); *H01M 8/065* (2013.01); *B63H 21/383* (2013.01); *B63H 2021/003* (2013.01); *B63J 4/006* (2013.01); *H01M 8/04029* (2013.01); *H01M 2250/20* (2013.01)

(58) Field of Classification Search
CPC ......... H01M 8/04141; H01M 8/04201; H01M 8/04216; H01M 8/04291; H01M 8/04738; H01M 8/04753; H01M 8/04761; H01M 8/04776; H01M 8/065
See application file for complete search history.

(56) References Cited

U.S. PATENT DOCUMENTS

| | | | | |
|---|---|---|---|---|
| 3,792,580 A | * | 2/1974 | Geres | C06D 5/00 222/389 |
| 4,135,361 A | | 1/1979 | Eisenhaure | |
| 4,261,956 A | | 4/1981 | Adlhart | |
| 5,372,617 A | * | 12/1994 | Kerrebrock | C01B 3/065 366/151.1 |
| 5,514,353 A | | 5/1996 | Adlhart | |
| 5,702,491 A | | 12/1997 | Long et al. | |
| 6,534,033 B1 | | 3/2003 | Amendola et al. | |
| 6,758,981 B2 | | 7/2004 | Mazza et al. | |
| 6,932,847 B2 | | 8/2005 | Amendola et al. | |
| 7,083,657 B2 | | 8/2006 | Mohring et al. | |
| 7,105,033 B2 | | 9/2006 | Strizki et al. | |
| 7,131,389 B1 | * | 11/2006 | Hawkes | B63G 8/001 114/330 |
| 7,220,290 B2 | | 5/2007 | Amendola et al. | |
| 7,282,073 B2 | | 10/2007 | Petillo et al. | |
| 7,316,718 B2 | | 1/2008 | Amendola et al. | |
| 7,323,148 B2 | | 1/2008 | Shah et al. | |
| 7,521,149 B2 | * | 4/2009 | Medeiros | H01M 4/40 429/105 |
| 7,530,931 B2 | | 5/2009 | Amendola et al. | |
| 7,540,892 B2 | | 6/2009 | Strizki et al. | |
| 8,372,168 B2 | | 2/2013 | Berry et al. | |
| 2002/0025462 A1 | | 2/2002 | Nakanishi et al. | |
| 2002/0034669 A1 | * | 3/2002 | Kobayashi | H01M 8/04089 429/432 |
| 2002/0100836 A1 | * | 8/2002 | Hunt | B63G 8/08 244/50 |
| 2003/0233829 A1 | * | 12/2003 | Girouard | F42B 19/00 60/649 |
| 2007/0063099 A1 | * | 3/2007 | Holloman, Jr. | B64C 1/0009 244/117 R |
| 2011/0005194 A1 | * | 1/2011 | Doyle | F02K 9/566 60/243 |
| 2012/0137950 A1 | * | 6/2012 | Rapp | C25B 1/12 114/331 |
| 2012/0280179 A1 | * | 11/2012 | Marsh | B01J 7/02 252/372 |
| 2012/0282166 A1 | * | 11/2012 | Wallace | C01B 3/06 423/652 |
| 2014/0232200 A1 | * | 8/2014 | Maekawa | B63G 8/001 307/104 |
| 2017/0104426 A1 | * | 4/2017 | Mills | H05H 1/24 |
| 2018/0156189 A1 | * | 6/2018 | Kohsaka | B62D 61/04 |

OTHER PUBLICATIONS

Keller, John, "Navy adds Fuelcell Energy and Sierra Lobo to researchers investigating long-endurance UUV propulsion" Aug. 7, 2012, 2 pages, https://www.militaryaerospace.com/unmanned/article/16719551/navy-adds-fuelcell-energy-and-sierra-lobo-to-researchers-investigating-longendurance-uuv-propulsion (Year: 2012).*

* cited by examiner

US 10,543,893 B2

UNDERSEA VEHICLE AND METHOD FOR OPERATING A REACTOR

CROSS-REFERENCE TO RELATED APPLICATIONS

This application claims priority to U.S. Provisional Application Ser. No. 62/511,817, filed May 26, 2017, the entire contents of which are incorporated herein by reference.

STATEMENT OF FEDERALLY FUNDED RESEARCH

This invention was made with government support under No. N00024-14-C-4083 awarded by United States Navy. The government has certain rights in the invention.

TECHNICAL FIELD OF THE INVENTION

The present invention relates in general to the field of undersea vehicles, and more particularly, to a novel undersea vehicle reactor and method of operating the same.

BACKGROUND OF THE INVENTION

Without limiting the scope of the invention, its background is described in connection with fuel cell systems.

U.S. Pat. No. 7,530,931, issued to Amendola, et al., is entitled "Hydrogen generator" and is said to teach a hydrogen generation system that includes a fuel container, a spent fuel container, a catalyst system and a control system for generating hydrogen in a manner which provides for a compact and efficient construction while producing hydrogen from a reaction involving a hydride solution such as sodium borohydride.

U.S. Pat. Nos. 7,220,290 and 6,534,033, issued to Amendola, et al., is entitled, "System for hydrogen generation" and is said to teach a composition and method for storage and controlled release of hydrogen, specifically, the use of borohydride based solutions as a hydrogen storage source and a catalyst system to release hydrogen therefrom.

U.S. Pat. Nos. 7,540,892 and 7,105,033, issued to Strizki, et al., entitled "Hydrogen gas generation system" are said to teach a system for generating hydrogen gas that uses a volume exchange housing for the storage of a fuel material that reacts to generate hydrogen gas and a hydrogen separation chamber, and includes a gas permeable membrane or membranes that allow hydrogen gas to pass through the membrane while preventing aqueous solutions from passing through the membrane.

U.S. Pat. No. 7,083,657, issued to Mohring, et al. is entitled "System for hydrogen generation" and is said to teach an improved system for the generation of hydrogen by contacting an aqueous solution of a metal hydride salt with a hydrogen generation catalyst, and the incorporation within the system of a recycle line of water condensed from the fluid product to the feed line to be contacted with the catalyst.

U.S. Pat. No. 6,932,847, issued to Amendola, et al., is entitled "Portable hydrogen generator" and is said to teach a hydrogen generation system includes a fuel container, a spent fuel container, a catalyst system and a control system for generating hydrogen in a manner which provides for a compact and efficient construction while producing hydrogen from a reaction involving a hydride solution such as sodium borohydride.

SUMMARY OF THE INVENTION

In one embodiment, the present invention includes an underwater vehicle power unit comprising: a fuel and waste stack comprising one or more reactant or fuel storage bladders and one or more waste storage bladders; a heater that pre-heats at least one of a fuel or a reactant prior to entering a reactor, wherein the reactor generates hydrogen and waste; a hydrogen and waste separator, wherein the waste is stored in the waste storage bladder and the waste does not form crystals by controlling at least one of the dilution in water, pressure, or temperature of the waste; a heat exchanger that cools the hydrogen; a back-pressure regulator that maintains a pressure in the reactor and an elevated temperature to prevent precipitation of the waste; a hydrogen and liquid separator, wherein the liquid is stored in a reservoir; a fuel cell capable of generating an electrical current when exposed to hydrogen; and a controller that controls the temperature of the heater, the flow of fuel into the reactor, the flow of hydrogen into the fuel cell, the flow of water that dilutes the fuel, and the flow of waste from the reactor and/or the fuel cell into the one or more waste storage bladders. In one aspect, the power unit further comprises one or more heat sinks in communication with at least one of the heat exchanger, the one or more fuel storage bladders, the reactor, the fuel cell, or the one or more waste bladders. In another aspect, the back-pressure regulator maintains a pressure in the reactor regardless of flow rate or $H_2$ production rate, reducing the concentration of the byproduct, or $NaBO_2$. In another aspect, the heat sink surrounds at least one of the one or more fuel storage bladders, the reactor, the fuel cell, or the one or more waste bladders. In another aspect, the fuel reactor and an oxygen generator operate under adiabatic conditions. In another aspect, the power unit further comprises one or more pumps and valves between the one or more fuel storage bladders, the reactor, the fuel cell, or the one or more waste bladders controlled by the controller and that manage the flow of fuel, hydrogen, and waste. In another aspect, the power unit further comprises a water recirculation system connected to the fuel cell, wherein water generated from the fuel cell is used to at least one of cool the reactor or fuel cell, or dilute a fuel. In another aspect, the power unit further comprises a battery that powers one or more pumps and valves when the fuel cell is not generating an electrical current. In another aspect, an oxidizer is further defined as comprising a peroxide pump, a flow meter, a heat exchanger, a back pressure regulator, a phase separator, an accumulator and a forward pressure regulator. In another aspect, the power unit further comprises a back-pressure regulator between the oxidizer and the fuel cell. In another aspect, the power unit further comprises one or more heat sources at one or more cold spots between the reactant or fuel storage bladders and waste storage bladders to prevent precipitation of reactants, byproducts, and/or waste in the power unit. In another aspect, a reactant for use in the fuel cell system is a metal-hydride. In another aspect, a reactant for use with the present invention is selected from at least one of $NaBH_4$, $LiBH_4$, $KBH_4$, $Ca(BH_4)_2$, or $Mg(BH_4)_2$.

In another embodiment, the present invention includes a method of powering an underwater vehicle with a power unit comprising: providing a fuel and waste stack comprising one or more reactant or fuel storage bladders and one or more waste storage bladders; pre-heating at least one of a fuel or a reactant prior to entry into a reactor; injecting the pre-heated fuel or the reactant into the reactor to generate hydrogen; connecting the one or more fuel storage bladders, the reactor, a fuel cell, or the one or more waste bladders to a heat exchanger; controlling at least one of a dilution in water, a pressure, or a temperature of a waste stream to prevent crystallization of the waste in the reactor; connecting the output from the reactor to the fuel cell capable of generating an electrical current when exposed to hydrogen; and connecting a controller that controls the heater, the flow of fuel to the reactor, the flow of hydrogen to the fuel cell, the flow of waste from the reactor and/or the fuel cell to the one or more waste storage bladders. In one aspect, method further comprises providing one or more heat sinks in communication with the at least one of the one or more fuel storage bladders, the reactor, the fuel cell, or the one or more waste bladders. In another aspect, the back-pressure regulator maintains a pressure in the reactor regardless of flow rate or $H_2$ production rate, reducing the concentration of the byproduct, or $NaBO_2$. In another aspect, at least one of the heater, the heat-exchanger, or the back-pressure regulator are operated to maintain a reactor byproduct fully soluble at localized cold spots during startup and steady state operation. In another aspect, the heat sink surrounds at least one of the one or more fuel storage bladders, the reactor, the fuel cell, or the one or more waste bladders. In another aspect, the method further comprises providing one or more pumps and valves between the one or more fuel storage bladders, the reactor, the fuel cell, or the one or more waste bladders controlled by the controller and that manage the flow of fuel, hydrogen, and waste to maintain the underwater vehicle gravimetrically balanced during dive or surfacing operations. In another aspect, the method further comprises connecting a water recirculation system connected to the fuel cell, wherein water generated from the fuel cell is used to at least one of cool the reactor or fuel cell, or dilute a fuel. In another aspect, the method further comprises providing a battery that powers one or more pumps and valves when the fuel cell is not generating an electrical current. In another aspect, an oxidizer is further defined as comprising a peroxide pump, a flow meter, a heat exchanger, a back pressure regulator, a phase separator, an accumulator and a forward pressure regulator. In another aspect, the method further comprises providing a back-pressure regulator between the oxidizer and the fuel cell. In another aspect, the method further comprises providing one or more heat sources at one or more cold spots between the reactant or fuel storage bladders and waste storage bladders to prevent precipitation of reactants, byproducts, and/or waste in the power unit. In another aspect, a reactant for use in the fuel cell system is a metal-hydride. In another aspect, a reactant for use with the present invention is selected from at least one of $NaBH_4$, $LiBH_4$, $KBH_4$, $Ca(BH_4)_2$, or $Mg(BH_4)_2$.

BRIEF DESCRIPTION OF THE DRAWINGS

For a more complete understanding of the features and advantages of the present invention, reference is now made to the detailed description of the invention along with the accompanying figures and in which:

FIGS. 22A and 22B are graphs that show the product as a weight percent wt % of the $NaBH_4$ and $NaBO_2$, in relation to: FIG. 22A the wt % of reactant $NaBH_4$, and in FIG. 22B the wt % of the reactant $H_2O_2$.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Effective Gravimetric and Volumetric Storage of Aqueous $NaBH_4$.

Typically, fuel cells are used for low mass and/or low volume applications. This is primarily due to the high relative efficiency of the fuel cell and separation of the reactants from the power generation device (fuel cell). Specifically, proton exchange membrane (PEM) fuel cells require hydrogen gas as a fuel. Effective mass and volume storage of the hydrogen is currently a major barrier for the viability of fuel cells. Chemical hydrides, which store hydrogen in a chemical compound for effective mass and volumetric storage, have become a promising solution. A great deal of investigation has been performed on Sodium Borohydride ($NaBH_4$) specifically due to its high gravimetric hydrogen wt %, purity, and the high stability and solubility of the compound in an aqueous solution. $NaBH_4$ reacts with water to form hydrogen gas and Borate while releasing heat (Equation 1).

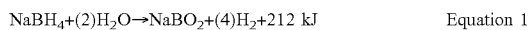

$$NaBH_4 + (2)H_2O \rightarrow NaBO_2 + (4)H_2 + 212 \text{ kJ} \quad \text{Equation 1}$$

Figure 1:
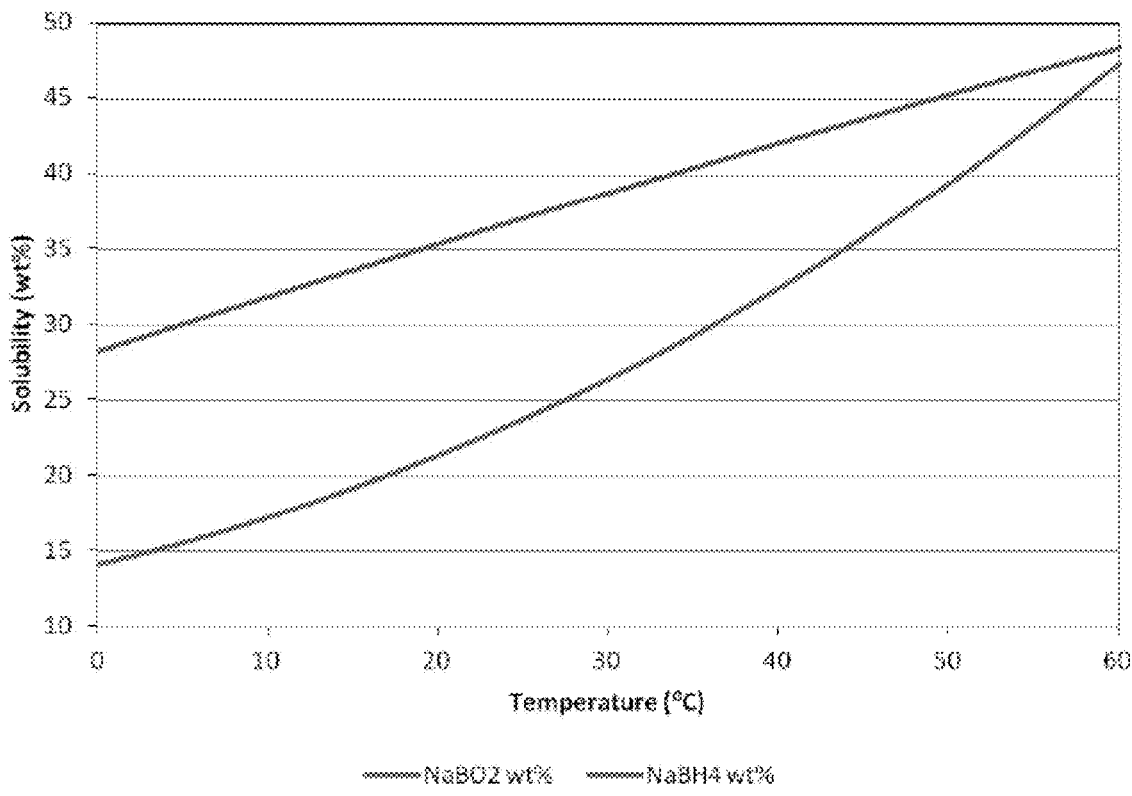
FIG. 1 is a graph that shows the solubility of aqueous sodium borohydride and sodium borate as a function of temperature.

As can be seen by the reaction, the ideal ratio of $NaBH_4$ to water is 1:2 moles respectively, or 51 wt % of $NaBH_4$. Since $NaBH_4$ may be stored with a relatively high stability as an aqueous solution, catalytic reactors are used to generate the hydrogen on demand. FIG. 1 is a graph that shows the solubility of aqueous sodium borohydride and sodium borate as a function of temperature.

Figure 2:
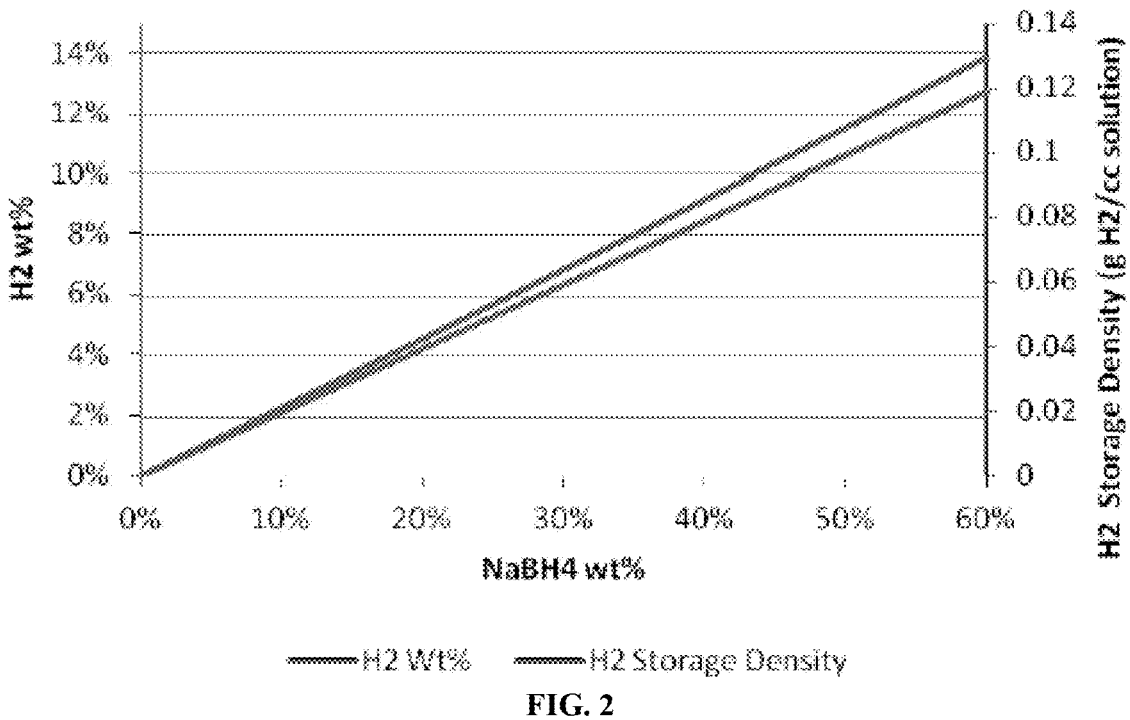
FIG. 2 is a graph that shows the effective gravimetric and volumetric storage of hydrogen vs. $NaBH_4$ wt % at 20° C.

However, the solubility of the byproduct, borate, is significantly less soluble than the reactant, $NaBH_4$ (FIG. 1). To make matters worse, water is consumed during the reaction, reducing the amount of water to solubilize the byproduct. If the maximum solubility is exceeded during the reaction inside the reactor, solid crystals are formed which physically damage the reactor due to clogging and catalyst erosion. Therefore, the maximum solubility of the reactant, $NaBH_4$, can never be realized in storage as the solubility of the byproduct, Borate, limits the $NaBH_4$ feed concentration. This is problematic since the goal of using $NaBH_4$ in the first place is to increase the gravimetric and volumetric storage of hydrogen. FIG. 2 is a graph that shows the effective gravimetric and volumetric storage of hydrogen vs. $NaBH_4$ wt % at 20° C.

The present inventors have developed specific solutions to increase the effective storage concentration of aqueous $NaBH_4$ that addresses the issue of reduced $NaBO_2$ solubility.

Solution A—Back Pressure Regulator (Affects all $NaBH_4$ Reactors).

Figure 3:
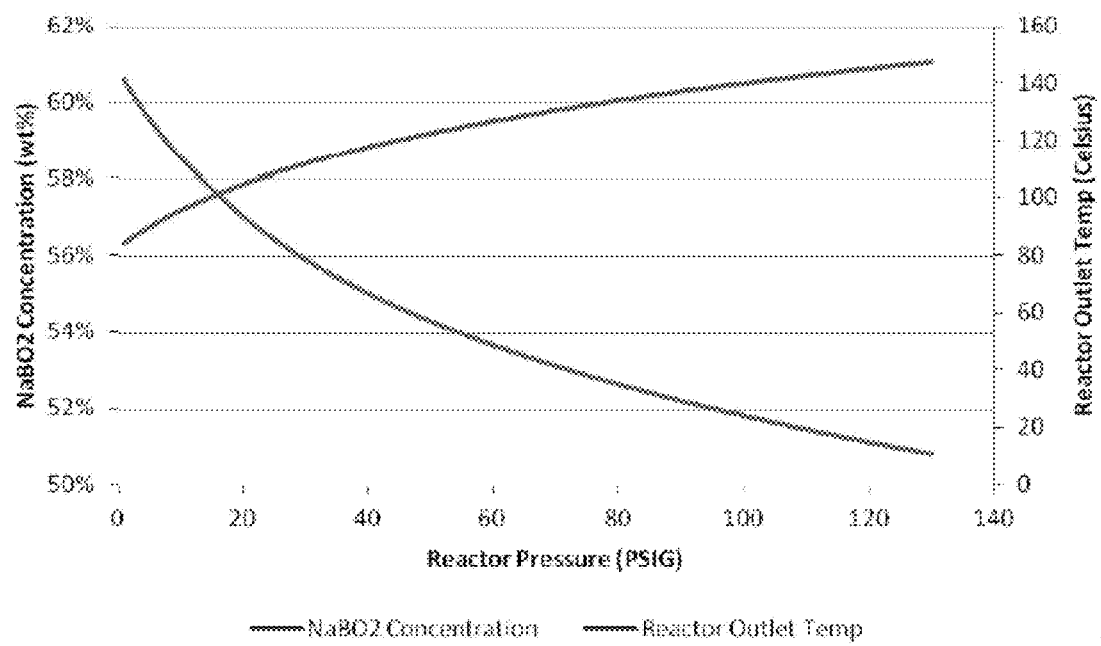
FIG. 3 is a graph that shows theoretical $NaBH_4$ reactor outlet parameters vs. back-pressure assuming inlet conditions of 20 wt % $NaBH_4$, 20 C, 100% hydrolysis reaction conversion and adiabatic conditions.

Even though fully soluble $NaBH_4$ solutions are fed into the reactor, the byproduct, $NaBO_2$, can crash out of solution, crystallizing and in the process damaging the reactor due to the limited solubility. Solubility of the byproduct is dependent upon the amount of liquid water available and the temperature of the system (FIG. 1). Although the solubility of the byproduct cannot be changed, the temperature and available liquid water fraction may be somewhat controlled. Most often, the reactor will operate under adiabatic conditions to simplify the reactor design by eliminating the necessity of a cooling system. In this adiabatic case, the outlet temperature of the reactor may be calculated from the inlet temperature and system pressure alone, assuming complete reaction (FIG. 3). Therefore, assuming a room temperature inlet, only the temperature and thus back-pressure of the reactor affects the solubility of the byproduct. During operation, increasing the pressure increases the temperature and the available liquid water, both improving the solubility of the byproduct ($NaBO_2$). To overcome this problem, which was verified both theoretically (via thermodynamics) and experimentally, the present inventors added a back-pressure regulator downstream of the reactor. This physical addition insures that the reaction takes place at an elevated pressure, regardless of flow rate or $H_2$ production rate, reducing the concentration of the byproduct, $NaBO_2$, thus substantially increasing reactor lifetime. FIG. 3 is a graph that shows theoretical $NaBH_4$ reactor outlet parameters vs. back-pressure assuming inlet conditions of 20 wt % $NaBH_4$, 20 C, 100% hydrolysis reaction conversion and adiabatic conditions.

Solution B—Pre-Heating Fluid with HX (Effects all $NaBH_4$ Reactors).

Figure 4:
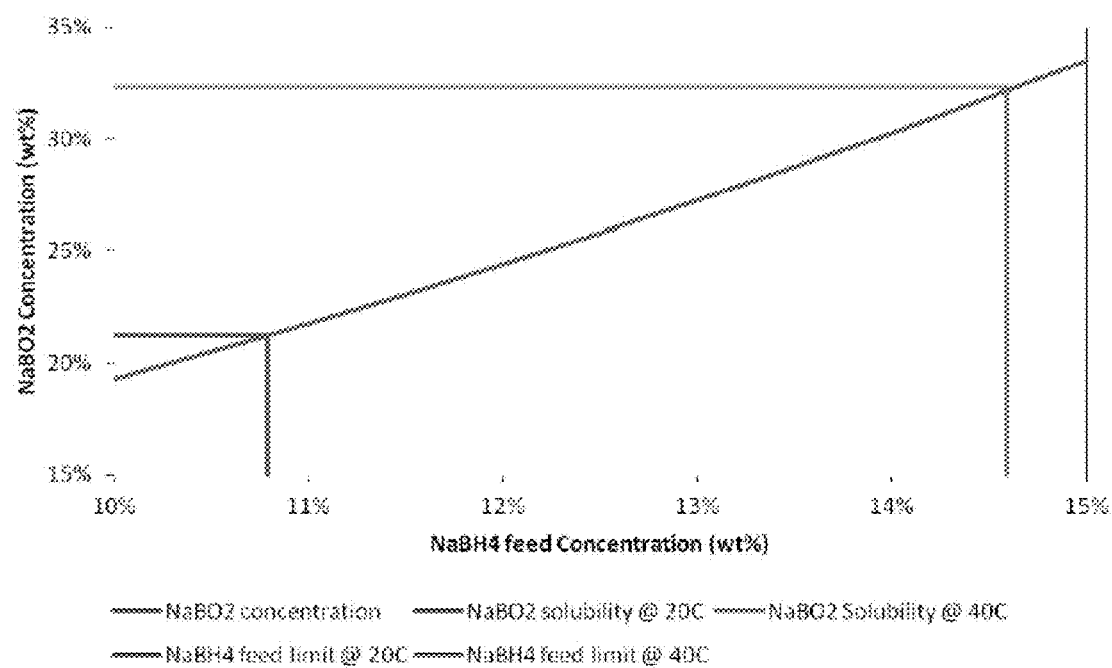
FIG. 4 is a graph that presents the stoichiometric and thermodynamically compensated relationship between the $NaBH_4$ feed concentration and $NaBO_2$ outlet concentration for an adiabatic reactor operating at 60 psig.

As shown previously in FIG. 3, increasing the pressure will increase the outlet temperature. However, the increased outlet temperature does not directly solve the byproduct solubility issue. The steady state operational reactor will have a thermal gradient from the inlet temperature to the outlet temperature. Therefore, even though the borate at the outlet of the reactor will be fully soluble, some reaction, forming borates, will occur near the colder inlet of the reactor. The existence of borates at these localized cold spots can locally damage the reactor with a cumulative effect. Eventually, the reaction zone will shift from the inlet of the reactor towards the outlet as the cold spots and thus degradation propagates through the reactor. Under these conditions, the reactors life will be quite short. However, this degradation mechanism may be significantly reduced with intelligent control of the inlet feed concentration and temperature. FIG. 4 is a graph that shows the relationship between $NaBH_4$ feed concentration and $NaBO_2$ outlet concentration for an adiabatic reactor operating at 60 psig. If the inlet temperature is increased from 20 to 40° C., the limiting feed concentration of $NaBH_4$ may be increased from 10.8 to 14.6 wt % respectively, while maintaining full solubility of the borate byproduct at inlet cold spots.

FIG. 4 is a graph that shows the stoichiometric and thermodynamically compensated relationship between the $NaBH_4$ feed concentration and $NaBO_2$ outlet concentration for an adiabatic reactor operating at 60 psig. Also illustrated is the solubility limit of $NaBO_2$ at both 20 and 40° C. This gives a surprising insight that the $NaBH_4$ feed concentration may be increased substantially while maintaining full solubility of the $NaBO_2$ if the inlet temperature is increased. To overcome this problem, which was verified both theoretically (via thermodynamics) and experimentally, the present inventors insulated and preheated the reactor feed stream with electric heaters on startup and a novel integrated reactor heat exchanger during steady state operation. These physical additions insure that the $NaBO_2$ byproduct is fully soluble at localized cold spots during startup and steady state operation, thus substantially increasing reactor lifetime.

Solution C—System Level Water Management.

Figure 5:
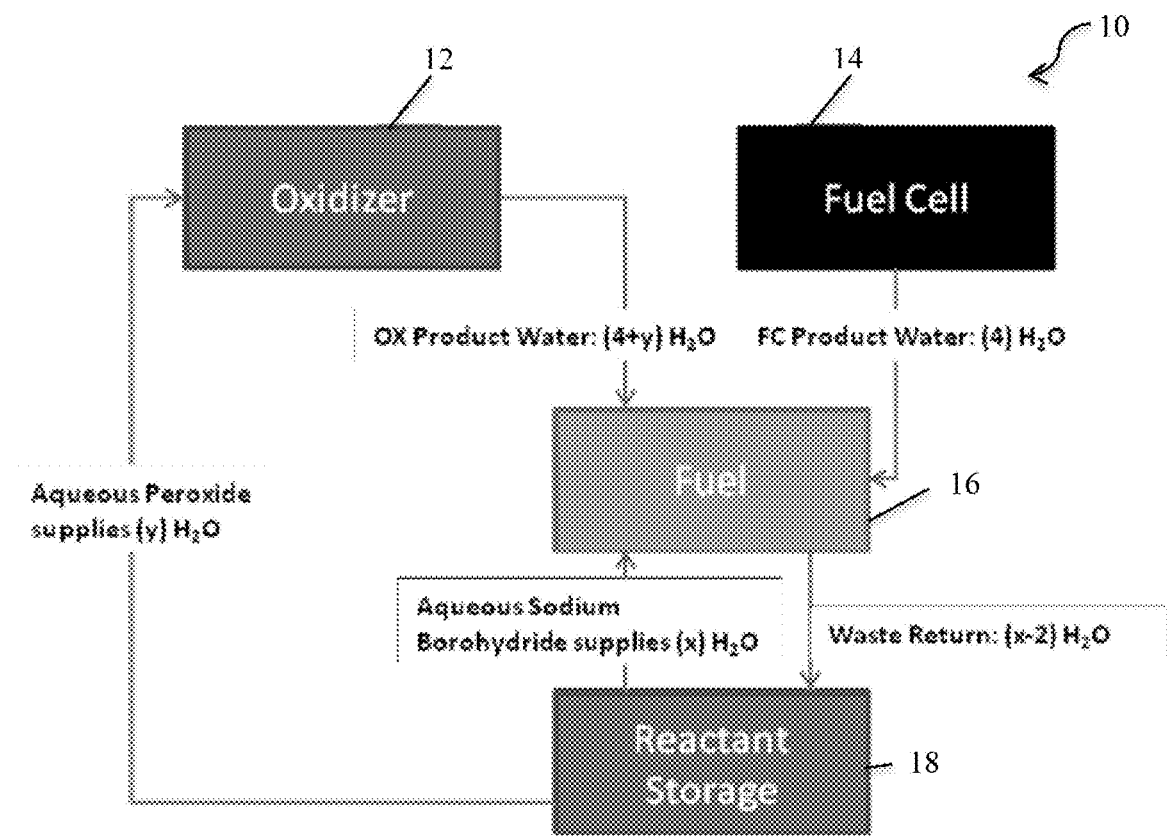
FIG. 5 is a diagram that shows the water management between the various sub-systems in terms of moles of water.

Storing NaBH$_4$ at elevated concentrations, or even in the solid form, would result in increased gravimetric and volumetric energy storage. However, above the ideal stoichiometric 51 wt %, not enough water is available for the reaction. Additionally, water limitations may cause the byproduct to crystallize in the reactor or in the waste storage vessel making it difficult to remove, requiring even lower feed concentrations (see FIG. 4). Many others have already investigated the idea of using wastewater from other parts of the system (for example fuel cell product water) for diluting the NaBH$_4$ either prior to or after the reactor. While the skilled artisan would expect the implementation of this water utilization design to become cumbersome and even dangerous, the present inventors demonstrate herein the advantages of this configuration and overcoming those challenges. The present inventors recognized the need for additional water in the NaBH$_4$ hydrolysis reaction, determined that a system level water management strategy is necessary. As such, the present inventors evaluated several fuel and oxidizer combinations for a PEM fuel cell and determined that the specific combination of NaBH$_4$ and H$_2$O$_2$ offers an attractive couple based specifically on water management. FIG. 5 is a diagram that shows the water management between the various sub-systems in terms of moles of water. In FIG. 5, the system level water management strategy is shown as flow chart 10, which shows an oxidizer 12 from which the OX product water (4+y) H$_2$O is combined with the fuel 14. The FC product water is obtained from Fuel Cell 14, with a reactant storage 18, in communication with the fuel 16. The waste return for the fuel 16 is L (x−2) H$_2$O, while the reactant storage 18 provides aqueous sodium borohydride that supplies (x) H$_2$O. The Reactant storage 18 is also in communication with oxidizer 12, to which is provides an aqueous peroxide supply of (y) H$_2$O.

Equations 2-4 show the system balanced stoichiometric chemical reactions for each step of the overall system. Equation 2 represents the NaBH$_4$ fuel hydrolysis reaction, which includes parameter "x" for water used to solubilize the reactants and products. Specifically, "x" is used to quantify the amount of water used to solubilize the NaBH$_4$ during storage and "y" is used to quantify the water used to dilute the hydrogen peroxide during storage. It should also be noted that 212 kJ of heat is released during this reaction. Equation 3 represents the hydrogen peroxide decomposition reaction. 392 kJ of heat is released during this reaction. Equation 4 represents the PEM fuel cell reaction, which releases a total energy of 1143 kJ. However, it should be noted that approximately half of this energy will be released as heat where as the other half will be transformed into electrical energy by the fuel cell assuming that the fuel cell is 50% efficient based on total available enthalpy.

Equation 2

Fuel Reaction $NaBH_4 + (x)H_2O_{(l)} \rightarrow NaBO_2 + (4)H_2 + (x-2)H_2O_{(l)} + 212 \text{ kJ}_{heat}$.

Equation 3

Oxidizer Reaction $(4)H_2O_{2(l)} + (y)H_2O_{(l)} \rightarrow (4+y)H_2O_{(l)} + (2)O_2 + 392 \text{ kJ}_{heat}$.

Equation 4

Fuel Cell Reaction $(4)H_2 + (2)O_2 \rightarrow (4)H_2O_{(l)} + 572 \text{ kJ}_{heat} + 572 \text{ kJ}_{electrical}$.

Equation 5

Overall System Reaction $NaBH_4 + (4)H_2O_{2(l)} + (x+y)H_2O_{(l)} \rightarrow$ $NaBO_2 + (6+x+y)H_2O_{(l)} + 1176 \text{ kJ}_{heat} + 572 \text{ kJ}_{electrical}$.

Equation 6

Fuel reaction with full water utilization (from Oxidizer and fuel cell)

$NaBH_4 + (8+x+y)H_2O_{(l)} \rightarrow$ $NaBO_2 + (4)H_2 + (6+x+y)H_2O_{(l)} + 212 \text{ kJ}_{heat}$.

Equation 7

Fuel byproduct concentration assuming full water utilization $$\text{Wt \% NaBO}_{2(aq.)} = \frac{NaBO_2}{NaBO_2 + (6+x+y)H_2O} = \frac{65.8}{65.8 + (6+x+y)18} \text{ wt \%}.$$

Equation 8

Fuel reactor feed concentration assuming full water utilization $$\text{Wt \% NaBH}_{4(aq.)} = \frac{NaBH_4}{NaBH_4 + (8+x+y)H_2O} = \frac{37.8}{37.8 + (8+x+y)18} \text{ wt \%}.$$

Equation 9

Overall System Efficiency based on total Enthalpy (HHV)

$$\eta_{electrical} = \frac{Energy_{electrical}}{Energy_{Total}} = \frac{572 \text{ kJ}}{572 \text{ kJ} + 1176 \text{ kJ}} = 33\%.$$

If Equation 2-4 are condensed into one overall system equation, the result is Equation 5 which may be used to calculate the final NaBO$_2$ storage concentration assuming that all of the product water is mixed with the waste (Equation 7). However, if this product water is mixed with the NaBH4 fuel prior to the reactor feed, Equation 2 turns into Equation 6, which may be used to calculate the reactor feed concentration (Equation 8). Another interesting observation from Equation 5 is that the overall system efficiency based off of total available enthalpy is ~33% (Equation 9).

Figure 6:
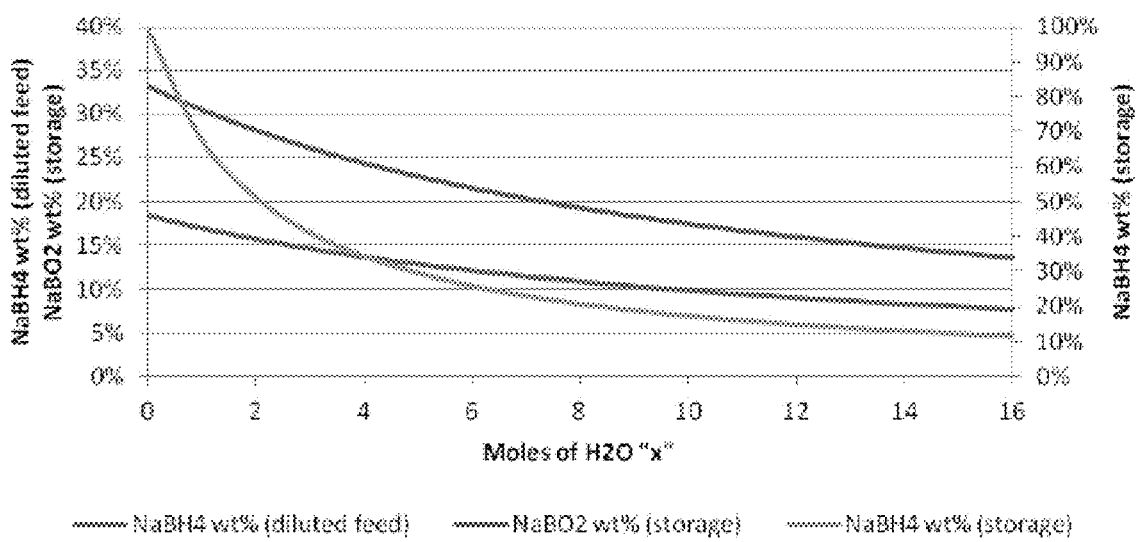
FIG. 6 is a graph that shows $NaBH_4$ and $NaBO_2$ wt % as a function of moles of water (in reference to Equations 2-8).
Figure 7:
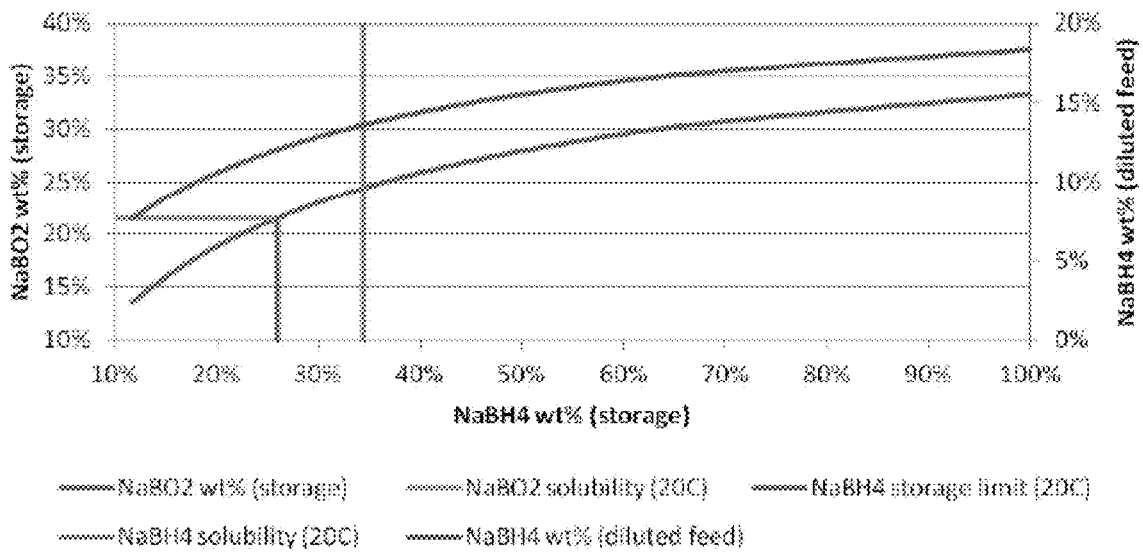
FIG. 7 is a graph that shows $NaBO_2$ concentration at the storage vessel and $NaBH_4$ diluted concentration at the reactor inlet as a function of $NaBH_4$ storage concentration.

Although pure 100 wt % H$_2$O$_2$ is available, shipping and safety regulations can limit the practical concentration of H$_2$O$_2$ to 59 wt %. Therefore, 59 wt % H$_2$O$_2$ was used for the following calculations as it represents one practical maximum concentration. The skilled artisan will recognize, using the teachings herein, that the wt % of the H$_2$O$_2$ can be varied based on the equations above to use any wt % necessary to achieve the required reactant. For example, the wt % of H$_2$O$_2$ can be used at 20, 30, 40, 50, 55, 59, 60, 61, 62, 64, 65, 70, 75, 80, 85, 90, 95, or 100 wt % and the moles can be varied accordingly. For these calculations, with 59 wt % H$_2$O$_2$, y=1.31 moles, which was used as a constant. This results in the only variable in the relations being x. Therefore, the final NaBO$_2$ concentration may be plotted as a function of x (or storage NaBH$_4$ wt %). FIG. 6 is a graph that shows NaBH$_4$ and NaBO$_2$ wt % as a function of moles of water (in reference to Equations 2-8), y=1.31. FIG. 7 is a graph that shows NaBO$_2$ concentration at the storage vessel and NaBH$_4$ diluted concentration at the reactor inlet as a function of NaBH$_4$ storage concentration. All the product water from the fuel cell and $H_2O_2$ reaction can be used for the fuel reaction. Based on this relation, enough water is theoretically available even if solid anhydrous $NaBH_4$ is stored. At 20° C., the solubility of $NaBH_4$ is ~35 wt %, therefore enough water is available to dissolve all of the solid $NaBH_4$ into an aqueous solution for fluidic delivery to the fuel reactor. If a fully soluble waste product is desired at 20° C., 21 wt % $NaBO_2$ must be maintained which limits the $NaBH_4$ storage to 26 wt %, y=1.31.

Both $NaBH_4$ and $NaBO_2$ concentrations may be seen in FIG. 6 as a function of "x" (Moles of water stored with $NaBH_4$) and in FIG. 7 as a function of $NaBH_4$ weight percent (wt %) used for storage. Both FIGS. 6 and 7 assume that all the product water from the fuel cell and $H_2O_2$ reaction is used for the fuel reaction (full water utilization). Based on this relation, enough water is theoretically available even if solid anhydrous $NaBH_4$ is stored. At 20° C., the solubility of $NaBH_4$ is ~35 wt %, therefore enough water is available to dissolve all of the solid $NaBH_4$ into an aqueous solution for fluidic delivery to the fuel reactor. If a fully soluble waste product is desired at 20° C., 21 wt % $NaBO_2$ must be maintained which limits the $NaBH_4$ storage to 26 wt %.

Figure 8:
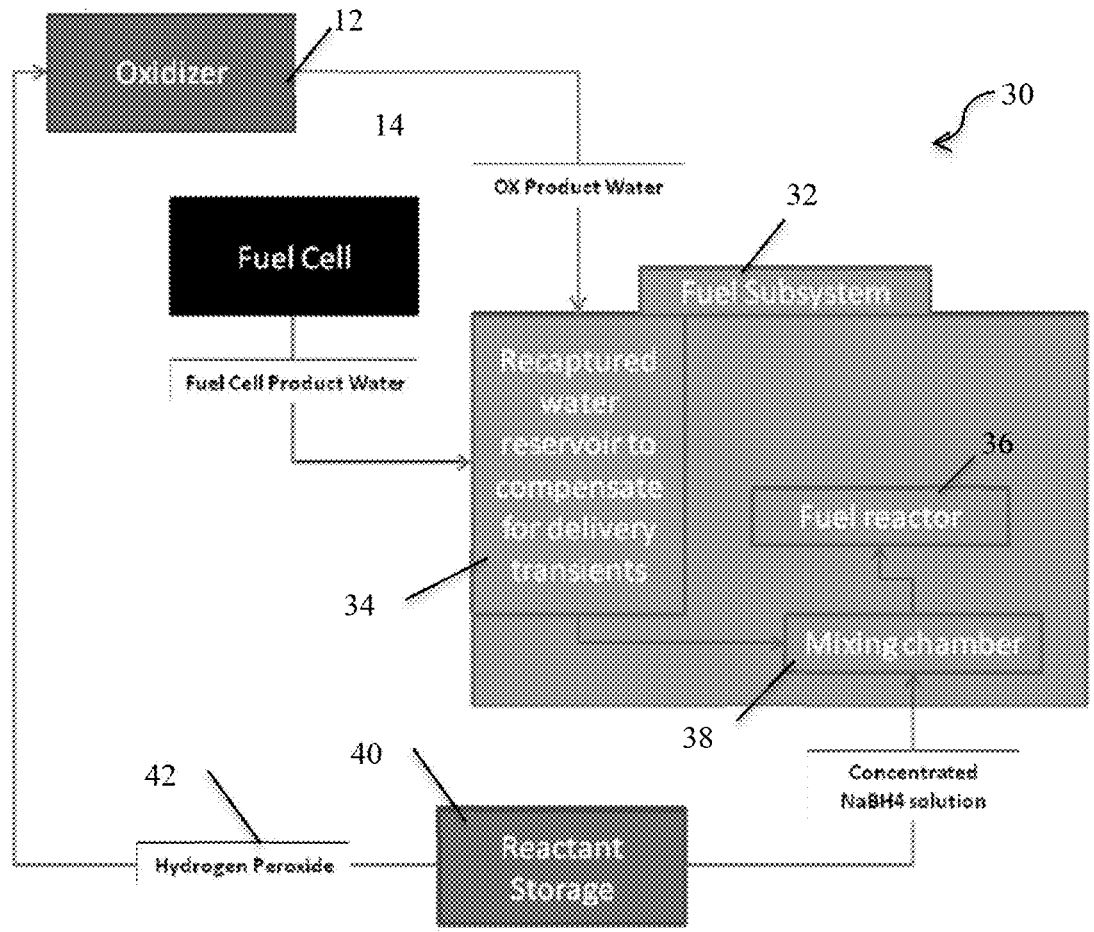
FIG. 8 is a block diagram that shows a system for level water management of the present invention.

FIG. 8 shows a block diagram of the system for level water management 30 of the present invention. The oxidizer 12 that provides OX product water and the fuel cell 14 that provides fuel cell product water, are depicted. These connect to a fuel subsystem 32, which is a common recaptured water reservoir 34, which is used account for delivery transients. This allows for a continuous flow of water to be delivered to the reactor 36, avoiding transient concentration shifts. The rate of water dilution is controlled with a specialized water level feedback loop, which prevents the water reservoir from emptying or overfilling while insuring a minimum threshold fuel dilution and full system level water utilization. A specialized mixing chamber 38 is also used to reduce the possibility of concentrated $NaBH_4$ solutions from entering the reactor. The reactant, e.g., concentrated $NaBH_4$, is obtained from the reactant storage containers 40, one of which can provide hydrogen peroxide 42.

The present inventors obtained full water utilization with the $NaBH_4/H_2O_2$ couple via unique water recapture, storage and subsequent dilution strategies. Custom phase separators are used to capture the liquid product water from the oxidizer reactor, fuel cell anode and fuel cell cathode safely without permitting any entrained gas. This captured water is then delivered to a temporary water storage reservoir to account for system transients. The water is then pumped from the system level water reservoir and mixed with the fuel stream prior to delivery to the fuel reactor. The rate of water dilution is controlled with a specialized feedback loop, which prevents the water reservoir from emptying or overfilling while insuring a minimum threshold fuel dilution and full system level water utilization.

Solution D—Fuel/Oxidizer Intra-Subsystem Water Recovery.

Although utilizing this unique system level water management approach (discussed previously) theoretically yields enough liquid water to fully solubilize solid anhydrous $NaBH_4$, this precise water balance is difficult to achieve in practice. These difficulties are a result of system transients, thermal imbalances and practical accuracies/controls of flow meters and pumps (especially at very small volumetric rates).

Any additional water that may be recaptured and used to dilute the feed streams is useful for both the fuel and oxidizer reactors. As discussed previously, reducing the fuel reactor feed concentration reduces the chances of borate (by-product) precipitation, which leads to reactor damage and diminished lifetime. However, the hydrogen peroxide reactor may also benefit from reduced inlet concentrations with increased lifetimes.

One of the primary $H_2O_2$ reactor degradation mechanisms is contamination from the stabilizers used in the $H_2O_2$ itself. Lack of available liquid water throughout the $H_2O_2$ reaction can lead to precipitation of the stabilizer (commonly Potassium or Sodium Stannate) onto the catalyst, thus reducing catalytic activity. Similar to the fuel reaction, more liquid water is available when utilizing lower concentrations of $H_2O_2$ and when running at higher pressures with a BPR. Additionally, the $H_2O_2$ reaction can see localized and transient water shortages (caused by flow pulsations) again leading to stagnation and precipitation of the stabilizer. For these reasons, adding additional water to the inlet of the $H_2O_2$ reactor and diluting the $H_2O_2$ concentration results in longer lifetimes.

However, due to the need for additional water by both the fuel and oxidizer subsystems, a decision must be made on which subsystem needs what allocations of water. This decision primarily depends on the relative storage concentrations of the $NaBH_4$ and $H_2O_2$ solutions. However, two unique intra-subsystem water recovery techniques may be used by both subsystems simultaneously without affecting the overall system level water balance.

Figure 9:
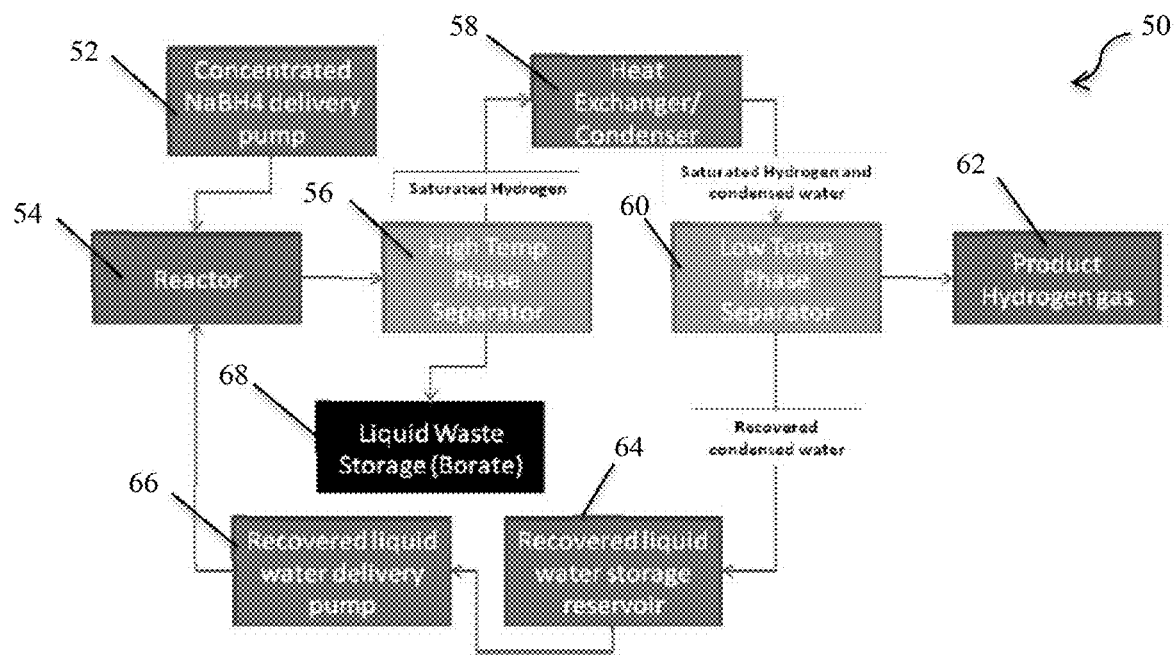
FIG. 9 is a block diagram of the fuel intra-subsystem water recovery technique. Two phase separators and a heat exchanger/condenser are used to separate the un-usable borate byproduct from the usable condensed product water.

For the fuel subsystem, additional product water was obtained by implementing a two-stage phase separation (see FIG. 9). The first stage of phase separation occurs at high temperature (>100° C.). As used herein, high temperature in the hydrogen/liquid separator is >100° C., for example 105, 110, 115, 120, 125° C. This removes the solubilized byproduct (borate solution) for subsequent waste storage. Saturated hydrogen gas then travels out of the top of the high temperature phase separator through a heat exchanger, cooling and condensing the saturated vapor down to about 60° C. As used herein, low temperature in the hydrogen/liquid separator is 50 to 90° C., for example 55, 60, 65, 70, 75, 80, 85, or 90° C. The two phase liquid/gas mixture then enters the low temperature phase separator where the liquid water may be captured and drained into a common liquid water storage tank (common to the other sources of recaptured water previously discussed). From there the water can be feed continuously back into the fuel reactor, thus further reducing the reactor inlet concentration. FIG. 9 is a block diagram 50 of the fuel intra-subsystem water recovery technique. Two phase separators and a heat exchanger/condenser are used to separate the un-usable borate byproduct from the usable condensed product water. A reactant, depicted in this example as concentrated $NaBH_4$ is provided via a delivery pump 52, which reactant enters reactor 54. Water produced at the reactor 54 enters a high temperature phase separator 56, which is saturated with hydrogen and enters a heat exchanger/condenser 58. The saturated hydrogen and condensed water then enters a low temperature phase separator 60, which separates the product hydrogen gas 62 from the recovered condensed water. The recovered condensed water enters the recovered liquid water storage reservoir 64, which can be pumped back into the reactor at recovered water delivery pump 66. The high temperature phase separator 56, separates the saturated hydrogen from the liquid waste, which is stored in liquid waste storage 68.

Figure 10:
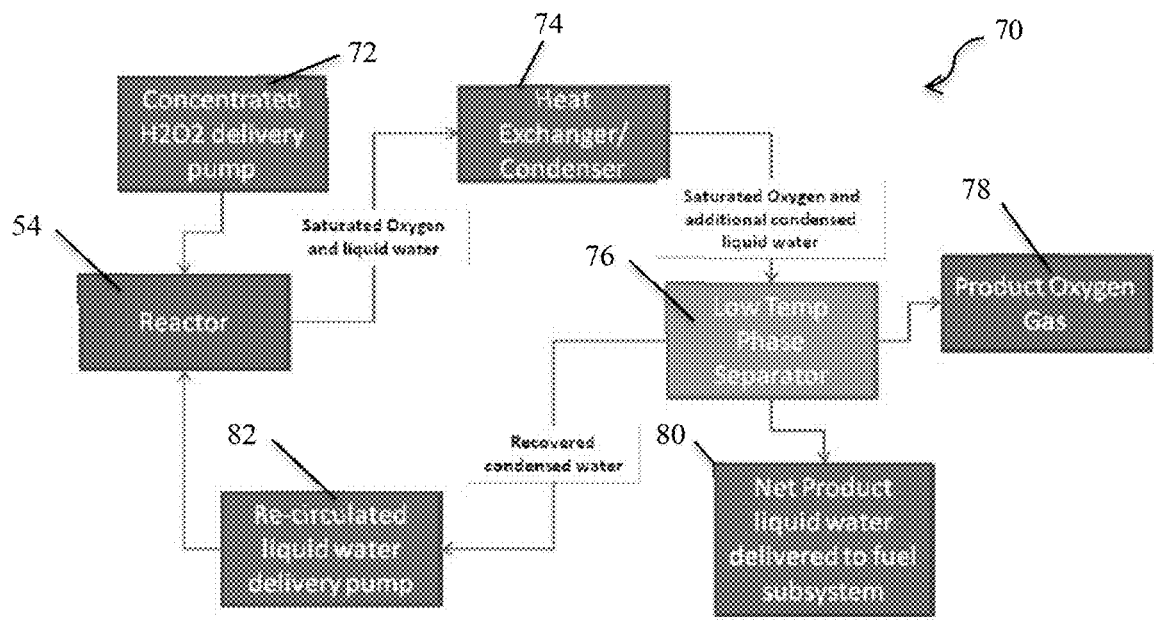
FIG. 10 is a block diagram of the $H_2O_2$ intra-subsystem water recovery technique.

Within the oxidizer subsystem, a unique water recirculation loop was used that is fundamentally different than the fuel subsystems (see FIG. 10). Since the $H_2O_2$ decomposition reaction has no products other than oxygen gas and water, the two-phase separator approach is not needed. The product stream from the reactor is fed directly into the heat exchanger where additional water vapor is condensed at ~60° C. Subsequently the two phase mixture is separated so that the liquid water may be both delivered to the fuel subsystem (as previously described) and re-circulated to the $H_2O_2$ reactor for additional dilution. Although the fuel intra-subsystem water recovery rate is limited by the enthalpy released by the hydrolysis reaction (this limits the amount of condensate recovered), the $H_2O_2$ re-circulation rate is theoretically unlimited and has no net effect on the rate of product water delivered to the fuel subsystem. This is realized since any liquid water removed from the phase separator and delivered to the reactor eventually ends up back in the phase separator. This allows the system to accurately control the $H_2O_2$ concentration at the reactor inlet without affecting the overall system level water balance. FIG. 10 is a block diagram 70 of the $H_2O_2$ intra-subsystem water recovery technique. A concentrated $H_2O_2$ is delivered by $H_2O_2$ pump 72, which concentrated $H_2O_2$ enters reactor 54. The reactor 54 generates a saturated oxygen and liquid water mixture, which enter heat exchanger/condenser 74. A saturated oxygen and additional condensed water exits the heat exchanger/condenser 74 and enters a low temperature phase separator 76. A product oxygen gas 78 is produced by the low temperature phase separator 76 with the net product liquid water delivered to the fuel subsystem 80. The recovered condensed water can be re-circulated liquid water that enters the re-circulated liquid water delivery pump 82, which fees the reactor 54. In one non-limiting example, the present inventors used the two aforementioned intra-subsystem water recovery techniques to further reduce both the $NaBH_4$ and $H_2O_2$ reactor inlet concentrations, significantly increasing reactor lifetime.

Bladder Manifold Management.

When aqueous $NaBH_4$ is selected as the hydrogen source of fuel for a power system, there are typically constraints on system mass and/or volume that lead to this selection because of its high gravimetric hydrogen wt %. In such an application, the oxygen source may be concentrated hydrogen peroxide ($H_2O_2$). $NaBH_4$ produces $NaBO_2$ as waste, and $H_2O_2$ produces water. In some cases, it is advantageous to retain the waste within the system until it is refueled, and to do so while limiting any shifts in center of gravity (CG) of the system.

In the case of case of underwater vehicles, for example, maintaining constant system buoyancy may be critical to vehicles without active ballast control, and retaining all waste products in a closed system is the most straightforward method of doing so. Additionally, CG shifts can result in unacceptable changes in vehicle attitude, leading to reduced navigation control. In this case, it is important to have confidence that the power system CG will stay within a narrow range as reactants are converted to waste.

Collapsible bladders for reactant and waste storage allow generated waste to fill the void left by consumed reactants. Their flexibility allows for adaptation to unique spaces and volumetric reactant-to-waste conversion ratios that deviate from 1:1. If the waste is more dense than the reactants consumed, it will simply fill its bladder more slowly than the reactant bladders collapse, or vice-versa. A rigid separation between the two volumes would not allow this expansion/contraction differential without additional compensating mechanisms. Although their flexibility is advantageous, collapsible bladders can result in unacceptable CG shifts if they do not fill or drain in a uniform or symmetric manner. Solutions to control or influence bladder filling/expansion and draining/collapse are discussed below.

Solution A—Restricted Fluid Movement Using Multiple Bladders as Baffles.

When the energy system changes pitch or roll attitude, gravity will tend to cause the fluids to shift to lower space if any room is available. Additionally, differences in densities between the fluids (reactants and waste) can cause them to shift during system pitch and/or roll so that less dense fluids move toward the new high point and more dense fluids move toward the new low point. In a vehicle, this means the CG shifts along the length of the vehicle, exaggerating pitch control inputs.

Figure 11:
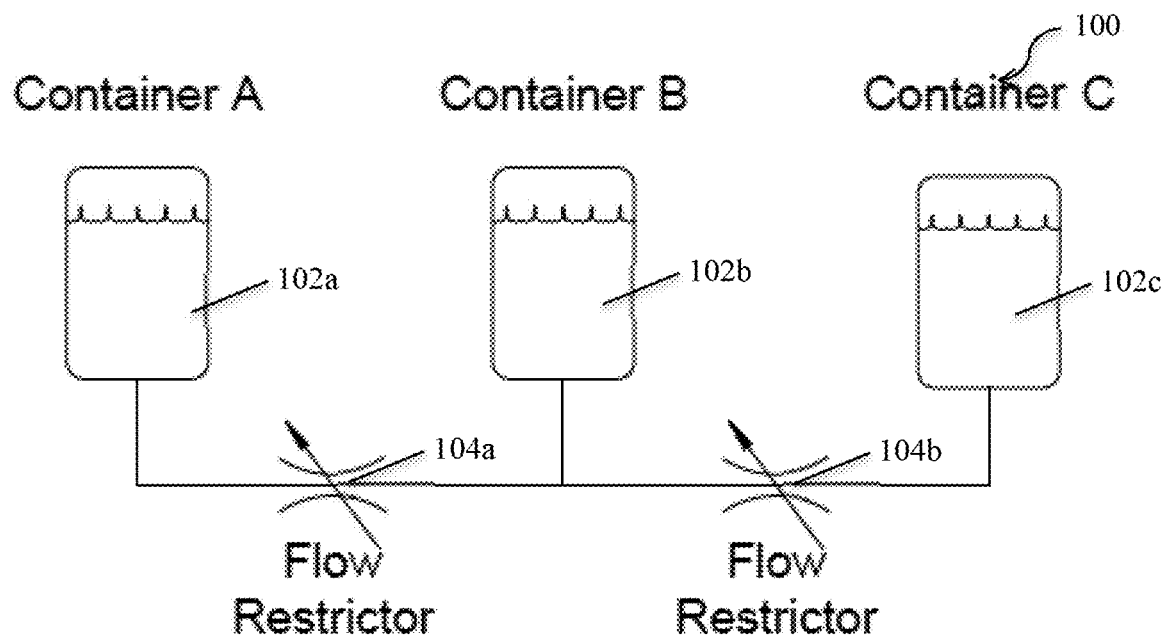
FIG. 11 is a diagram that shows multiple fluid containers with flow restrictors between the multiple fluid containers that dampen fluid movement during pitch and/or roll maneuvers.

Baffles spaced along the direction of attitude (i.e., along the length of the vehicle for pitched maneuvers) within the storage volume will slow down fluid shifting during short-term pitch or roll maneuvers, dampening the resultant CG shift. One implementation of storage containers that effectively baffles fluid flow is to divide the volume into multiple containers with flow restrictors between them. One example is to use multiple bladders connected in parallel to permit the contents to move between bladders, but with orifices or long lengths of small diameter tubing to slow that movement down to acceptable levels. FIG. 11 is a diagram that shows a restricted fluid movement using multiple bladders as baffles system 100, that shows multiple fluid containers 102a-c, with flow restrictors 104a,b between them to dampen fluid movement during pitch and/or roll maneuvers.

Solution B—Even Distribution of Flow Through a Manifold Using Flow Restrictions.

Flow from a single source through parallel lines in a system will be inversely proportional to the relative resistance to flow in each line. In order to fill multiple containers evenly, the flow resistance from the source to each container must be identical. Any variations will result in uneven filling. With open containers or rigid containers having fluid communication between containers at the head and drain (top and bottom), levels will even out over time after filling is complete. With collapsible containers having fluid communication at the head and drain, the fluid level will tend to seek its own, but the container size will not necessarily adjust, so that one container may remain expanded more than another if it receives more flow during filling.

Figure 12:
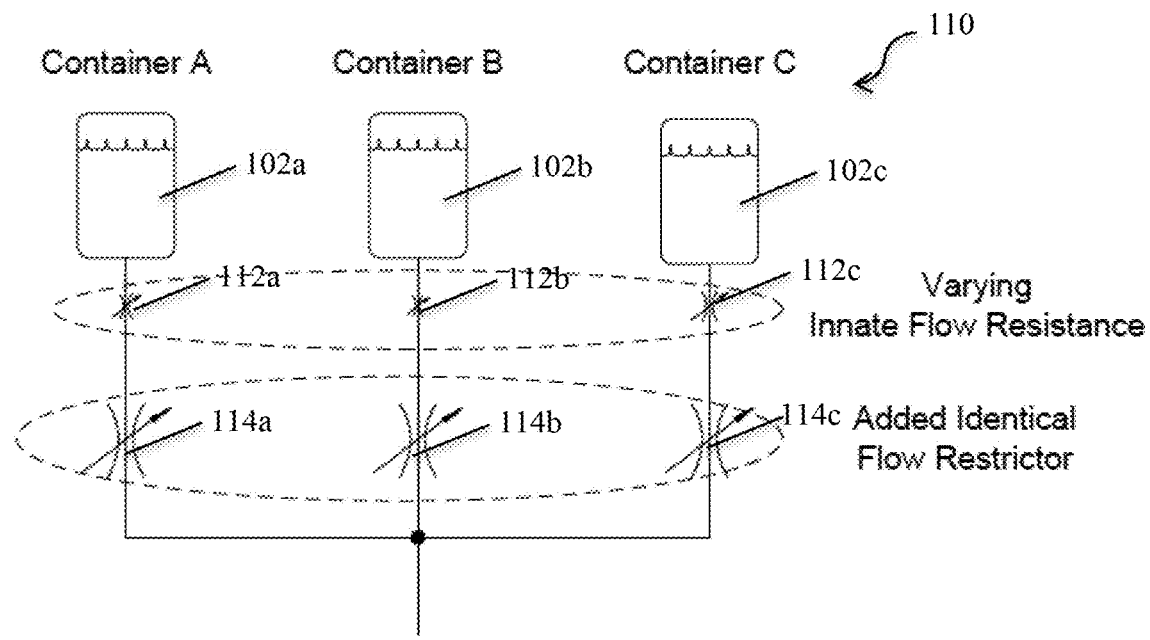
FIG. 12 is a diagram which shows that adding relatively large value resistance to parallel flow lines reduces the effect of minor differences.

Perfectly identical flow resistance in parallel is impossible to achieve, and differences may be significant in the case of collapsible containers because of constrictions or differences in resistance to expansion. Since the differences in flow are inversely proportional to flow resistance, one method to minimize differences is to place a large value of identical flow restriction in each parallel path. This reduces the relative impact of minor differences in resistance. For example, if two parallel lines had relative resistance of 1 and 1.5, the first line would receive 60% of flow and the other would receive 40%, a 20% difference. By adding resistance of 10 to each line, the lines would receive 51% and 49% each, only a 2% difference. For collapsible containers, minor resistances are difficult to avoid if the containers wrinkle or are constricted by adjacent components, so implementing a relatively large flow resistance reduces differences in filling or draining. This added resistance can also serve to limit flow between bladders as in Solution A. FIG. 12 is a diagram that shows an even distribution of flow through a manifold using flow restrictions system 110 and multiple fluid containers 102a-c, which shows that adding relatively large value resistance to parallel flow lines reduces the effect of minor differences using variable innate flow resistance 112*a-c* and added identical flow restrictors 114*a-c* in series, respectively.

Solution C—Balanced Reactant-to-Waste Transfer By Interleaved Bladders.

When each reactant solution is stored in its own separate space, the CG of each section is in the centroid of the fluid volume. Depending on the relative densities and volumes of each reactant, the combined CG of the reactants may not be in the centroid of the combined fluid volume. Once all the reactants are consumed and converted to waste, if the waste is evenly distributed in the volume vacated by the consumed reactants, the CG of the waste will be at the centroid of the fluid volume because only a single fluid exists at that point. This movement in CG may exceed the operational limits of the vehicle or other system using the power system.

Figure 13:
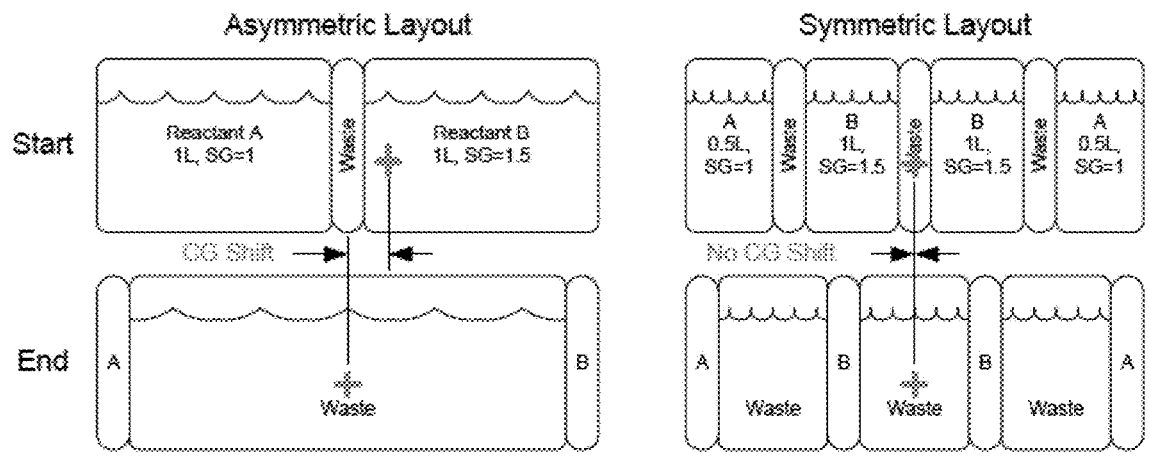
FIG. 13 is a diagram that shows an asymmetric layout results in horizontal CG shift if reactants are not of similar density and/or volume.

To avoid CG movement from the beginning of power production until all reactants are consumed, the layout of reactants should be symmetrical. This can be accomplished by dividing the reactants into multiple containers and alternating them in the layout. Waste containers situated between the reactant bladders allow waste to fill the space vacated by the reactants and keeps a constant horizontal CG location regardless of waste density. FIG. 13 is a diagram that shows an asymmetric layout results in horizontal CG shift if reactants are not of similar density and/or volume. Subdividing containers for a symmetric layout maintains a constant horizontal CG location.

Solution D—Pancake and Side-by-Side Bladder Configurations.

Specifically in reference to cylindrical reactant/waste container volumes, two different collapsible container (bladder) layouts each offer unique features to address implementation concerns.

Figure 14:
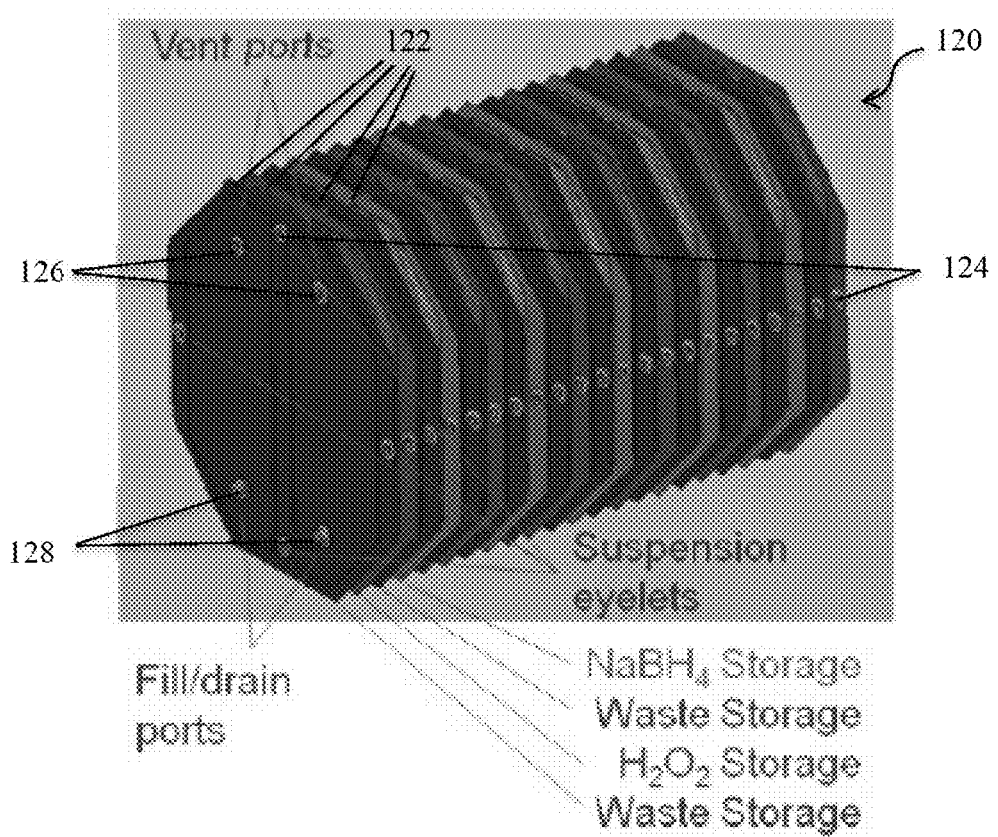
FIG. 14 is a diagram that shows a "pancake" bladder configuration with alternating reactant/waste pairs

The first configuration is composed of "pancake" bladders, stacked back-to-back along the axis of the cylinder. This layout permits small deflection of each individual bladder, resulting in predictable collapse and inflation geometry. It also permits implementation of Solution A (multiple bladders as baffles) and Solution C (symmetric layout) to minimize movement of the reactant/waste CG. The narrow aspect ratio also helps collect any offgas in the top of each bladder for ventilation purposes. The pancake design is amenable to other profiles, as well, since the overall shape can be fabricated to fit the geometry of the available space. Fabrication is straightforward since the bladders can be formed from two flat panels, sealed together around the perimeter. FIG. 14 is a diagram that shows a "pancake" bladder configuration 120 with alternating reactant/waste pairs 122. Suspension eyelets 124 are depicted that permit the bladders to be aligned on a frame (not depicted). Also shown are vent port(s) 126 and fill/drain ports 128. For example, the "pancake" bladder configuration 120 is depicted with alternating reactant/waste pairs 122, which alternate as follows: $NaBH_4$ storage, Waste Storage, $H_2O_2$ storage, and waste storage, thereby providing gravity balance during operation of the "pancake" bladder configuration 120 system and the overall system, and the reactants are expended at about the same rate as the waste is generated.

Figure 15:
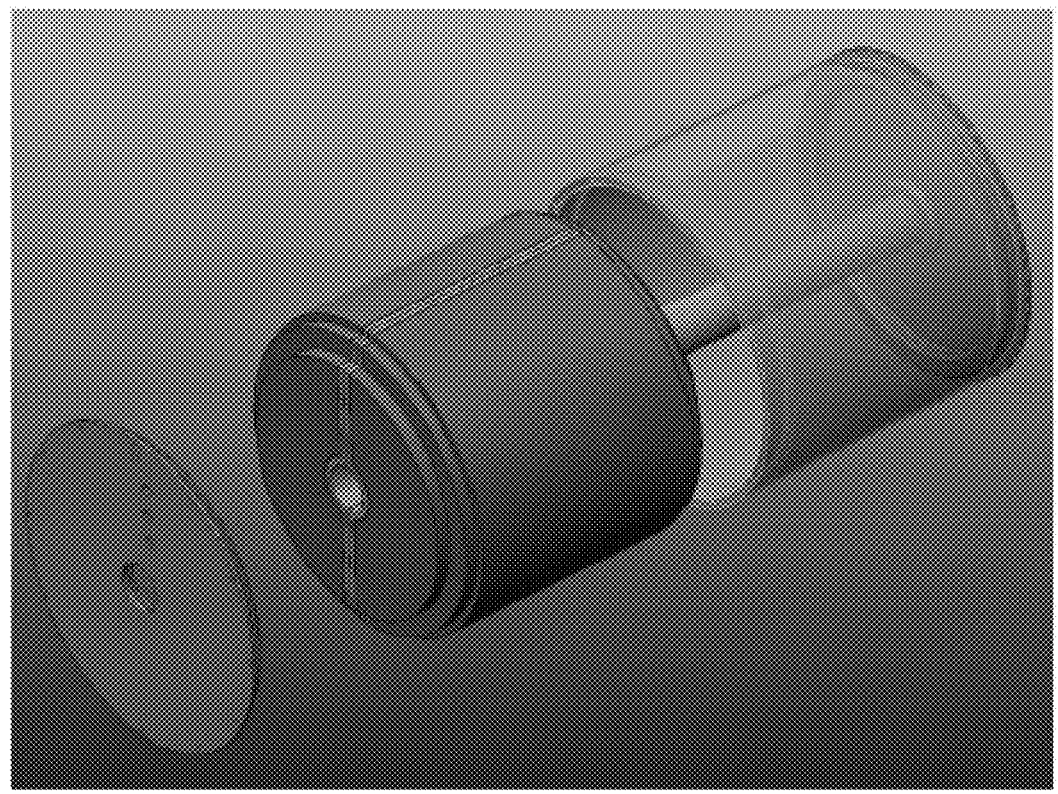
FIG. 15 is a diagram that shows side-by-side bladder configuration with reactant in purple and waste in orange (exploded view). Gray cylinder is for bladder installation and shows conduit passing through center.

The second configuration is useful when fluid densities and volumes are similar enough that CG shifting along the cylinder axis is not a concern. This layout places bladders side-by-side along the axis of the cylinder. The orientation of the bladders parallel to the cylinder wall is conducive to the bladder filling the available volume. The reason for this is when a two-panel flat container is inflated, it tends to assume a round shape due to the even pressure of the contents applied to the container wall. For a rectangular bladder in a cylindrical space, this means the bladder will naturally conform to the inside diameter of the cylinder. The two primary benefits of this approach are 1) more efficient use of space for reactant storage, and 2) the cylinder supports the bladder, reducing stress on the bladder wall. Since the shape readily fills the volume, the number of bladders required to use the space effectively is reduced. A single bladder could fill the cylindrical volume, but lateral symmetry is lost by having a single reactant container and a single waste container side-by-side. To maintain symmetry, two reactant bladders and two waste bladders can be situated on either side of the middle dividing line. A secondary benefit of this approach is it allows objects to extend through the middle of the reactant storage space, such as reinforcing tie-rods for the ends of the surrounding container, or for cables, tubing, or a conduit. FIG. 15 is a diagram that shows side-by-side bladder configuration with reactant in purple and waste in orange (exploded view). Gray cylinder is for bladder installation and shows conduit passing through center.

Filling process optimization. Aside from physical configuration of the bladders and tanks, taking specific process steps can help with balancing and maximizing fill volumes.

The first step to maximize fill volume and even distribution is to pre-inflate the bladders with gas. The chief advantage of the gas pre-fill is that the weight of the gas does not restrict the motion of the bladders as they expand. When filling an empty bladder (gas removed by vacuum) the liquid tends to run to the bottom. As the liquid weight builds, it causes the bladder to sag and may trap bladder material at the bottom of the tank, limiting its ability to expand upward and outward. Pre-filling with gas expands the bag without sagging. Subsequently, the reactants can be filled while gas is removed from the headspace via a vent at the same volumetric rate, thereby maintaining the optimum form of the bladder.

With the side-by-side bladder configuration, filling the interior bladders with reactants produces the most desirable result for space utilization. During the gas prefill, the interior bladders expand and flatten the exterior bladders against the outer wall of the tank. The collapsed bladders are designed to fit against the tank wall, so wrinkling and bunching are minimized. If the outer bladders are filled first, the inner bladders must crumple due to their excess material in the middle. This can result in voids and reduced tank volume utilization.

Bladder Gas Head Management.

As reactants and waste decompose, they generate gas. As this gas accumulates in the top of the bladders, it begins to pressurize the bladders and may lead to leaks or bursting. To relieve the gas build-up, vents are located high in the bladders. These vents are protected by hydrophobic, gas-permeable membranes to allow gas to escape while retaining liquids in the bladders. One embodiment of the vent is a small circular port mounted in the side of the bladder. This port functions effectively when the container volume is sufficiently oversized to allow a gas head to build up before significant pressure accumulates. If the liquid level rises above the vent, gas cannot escape, so any volume above the vent is not available for reactant storage. Additionally, the vent must be above the liquid level in all orientations experienced by the container for extended periods. Depending on the bladder design, it may not be desirable or possible to locate this port at the very top of the bladder. Finally, the vent area is limited by the size of the port, which can cause undesired gas flow restriction, prevent off-gas from escaping fast enough, or extend refueling times.

Figure 16:
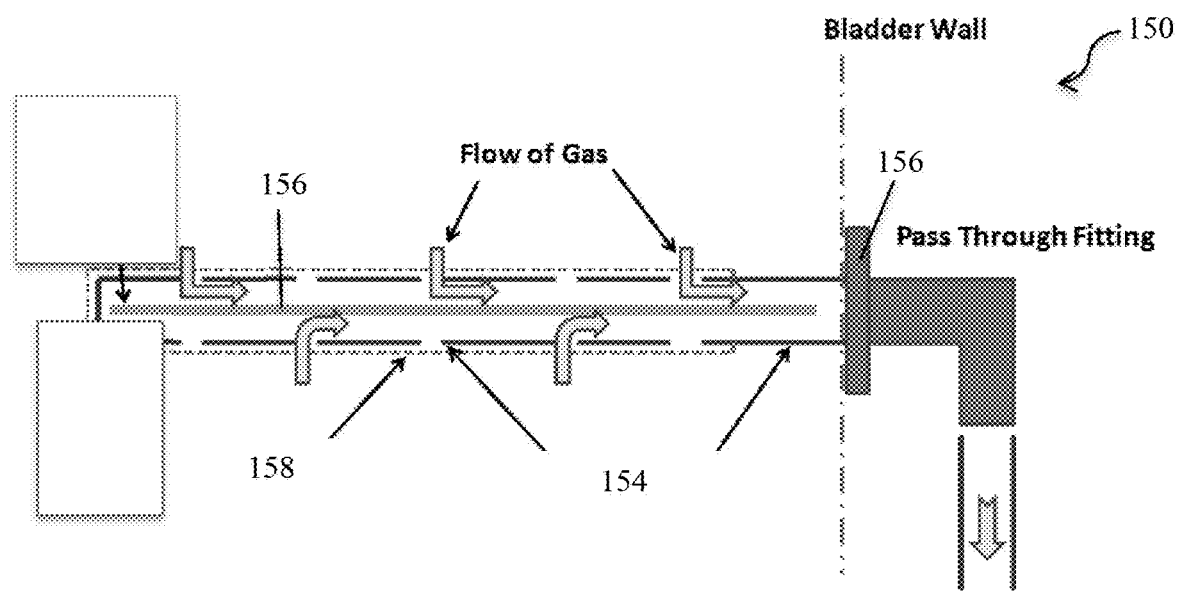
FIG. 16 is a cross-sectional side view of a perforated tube vent with internal stiffener can be installed through a small port and configured for best access to high points in the container for gas removal.

An improved gas vent is formed by locating a perforated tube in the top of the bladder and covering this tube in hydrophobic, gas-permeable membrane. This vent is superior to a single port because it can be located in the extremes of the bladder and service multiple positions, so that the high points in multiple orientations always have access to the vent. Since it can access the high points more effectively, more volume can be used for liquid storage rather than wasted as gas headspace. Additionally, the vent area is no longer limited to the port size, so a larger vent area can be provided to reduce gas flow restriction. This vent can be mounted internally in the bladder during fabrication using loops, clips or other standard means, but installation may be desired after the bladder is formed. Placing a wire inside the perforated tube allows it to be shaped and held in the proper location after inserting it through a small port, permitting installation, removal, and replacement without cutting or replacing the bladder. FIG. 16 is a cross-sectional side view of a perforated tube vent system 150 with internal stiffener that can be installed through a small port and configured for best access to high points in the container for gas removal. Alternatively to an internal stiffener, the perforated tube may be selected from material with plastic or elastic deformation properties that allow it to maintain position inside the bladder. The bladder wall is depicted into which a pass-through fitting 152 is attached that connects to the outside of the bladder. Inside the bladder the perforated tube vent system 150 includes a perforated tube 154 into which a wire 156 is inserted. A gas permeable film 158 surrounds the perforated tube 154 through which gas can flow.

The reaction of alkali and alkali-earth metal hydrides with water can be used for the generation of hydrogen. A non-limiting list of hydrides (in an aqueous solution) for use with the present invention are the ternary hydrides including $LiAlH_4$, $NaAlH_4$, $LiBH_4$ and $NaBH_4$. Other ternary hydrides, such as $Mg(AlH4)_2$ and liquid $Al(BH_4)_3$, can also be used with the present invention. Lithium, sodium and magnesium react directly with hydrogen, under commercially convenient pressures and temperature conditions, to form the binary metal hydrides LiH, NaH, and $MgH_2$.

The reaction of alkali and alkali-earth metal hydrides with water can be used for the generation of hydrogen. A non-limiting list of hydrides (in an aqueous solution) for use with the present invention are the ternary hydrides including $LiAlH_4$, $NaAlH_4$, $LiBH_4$ and $NaBH_4$. Other ternary hydrides, such as $Mg(AlH4)_2$ and liquid $Al(BH_4)_3$, can also be used with the present invention. Lithium, sodium and magnesium react directly with hydrogen, under commercially convenient pressures and temperature conditions, to form the binary metal hydrides LiH, NaH, and $MgH_2$.

Figure 17:
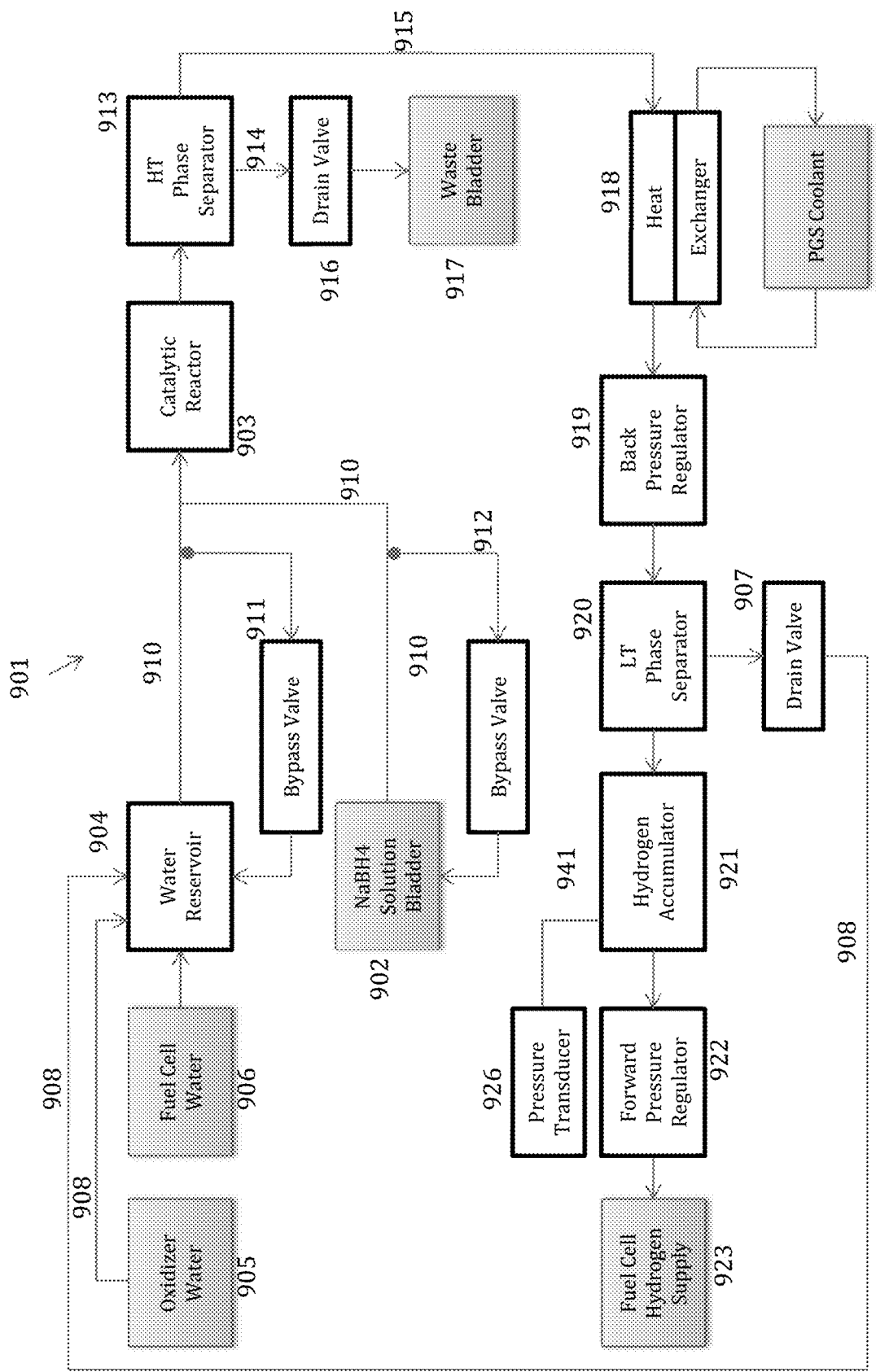
FIG. 17 shows a diagram of one embodiment of the hydrogen generator of the present invention.

Hydrogen Generation System. Sodium borohydride has high gravimetric hydrogen storage (amount of $H_2$ produced per unit weight of materials). Borate is formed as a byproduct when sodium borohydride undergoes hydrolysis to release hydrogen. Depending on conditions such as temperature and pressure, the borate's solubility can lead to the formation of undesirable solids unless due consideration is given. These solids can produce inefficiencies in reactor function, which negatively affects hydrogen generation. The present invention includes a continuous $H_2$ generator system to produce maximum hydrogen output using the highest effective storage concentration of sodium borohydride and, avoiding conditions where borate becomes insoluble. FIG. 17 is an embodiment of the hydrogen generator invention 901. The aqueous $NaBH_4$ is kept in one or more storage reservoirs 902. The preferred hydride storage concentration is between 10 and 30 wt %, preferably between 20 and 25% wt % for storage temperatures as low as 0° C. The expanded range is still viable for storage temperatures down to ~5° C. However, below this temperature, the upper limit of 30% has converged with the solubility limit, thus dramatically increasing the likelihood of precipitate formation within the stored $NaBH_4$. The $NaBH_4$ catalytic hydrolysis reactor 903 contains specialized catalysts with a high surface area that favor the hydrolysis of $NaBH_4$. The reactor allows flow of $NaBH_4$ solution through the reactor while retaining catalyst within the reactor beds. Additional water for the reaction (Eq 1) comes from a water reservoir 904. Water in the reservoir is supplied from several sources including (1) "oxidizer water" 905 from the oxidant production subsystem (Eq 3) (2) water 906 from a fuel cell (Eq 4) and (3) from water recovered from the output stream 907 of the catalytic hydrolysis reactor. Water is supplied from these sources to the water reservoir via fluid conduits. As the water in the reservoir is depleted, from use in the hydrogen generation system, the water is replenished at an equivalent rate with water from the aforementioned sources.

Transfer of water and fuel from the storage reservoirs and into the hydrolysis reactor is via two separate pumps and conduit system that manages the reactant mixing flow regime into the catalytic reactor 910. In addition to pumps, conduit system 910 can contain, flow meters, pressure sensing devices, mixing zones, and check valves, as described later. The transfer pumps for water and fuel into the hydrolysis reactor are under variable control and are critical elements of the hydrogen generator control architecture. Fluid transfer conduits between the fuel and water reservoirs and the reactor incorporate bypass loops 911, 912. The bypass loops contains valves which divert flow away from the reactor and back into the original storage containers in short duration pulses in order to clear the pumps of stalls in flow rate. The fuel solution tends to have micro bubbles entrained in the liquid due to the relatively small rate of natural, unassisted hydrogen generation. Sodium hydroxide is added to the $NaBH_4$ solution to stabilize the natural rate of $NaBH_4$ breakdown and hydrogen off gassing but gas production is not eliminated completely. The pump is appropriately sized to accommodate flow with only liquid against the expected reactor pressure at the required flow rates. However, as the fuel pump encounters solution with bubbles, there is a risk of a stall in flow rate. Because the reactor is kept at a high pressure relative to the storage container, the pump has to work harder to pump at a certain flow rate and the risk of experiencing stalls due to bubbles is increased. Once a stall is detected by the flow meters, the bypass valves open momentarily to clear bubbles. By exposing the outlet of the pump to a lower pressure (storage containers), the pump is able to clear bubbles out of the pump head easily so that when the outlet returns to the high pressure line there is only liquid in the pump head and it can operate normally. While bubbles are more of a concern with the fuel solution, a bypass valve was also added to the water loop so that both pumps are protected from stalls due to bubbles.

A high temperature phase separator is used to separate $H_2$ gas from a liquid 913. The residual liquid product contains dissolved $NaBO_2$ 914. The gas and liquid exiting the catalytic hydrolysis reactor is 915 at a temperature of ~60 to 180° C. The separated liquid is recovered via a drain mechanism 916 and is sent to waste bladder storage as described elsewhere in this application 917. Separated gas subsequently flows to a heat exchanger 918 where it is cooled to 60° C. At this point in the scheme a back pressure regulator is used 919. Condensed water is recovered by the low temperature phase separator 920 via a drain mechanism and is then delivered to the water reservoir. Stored $H_2$ is delivered to a fuel cell as needed from a $H_2$ accumulator 921. A forward pressure regulator 922 is included to adjust the $H_2$ to the desired pressure for the fuel cell 923. Product water from the fuel cell can be supplied via a conduit to the water reservoir 904.

The hydrogen generation system in FIG. 17 contains multiple pressure controlled zones. One pressure zone comprises the conduits between the water reactor 904, fuel reactor 902 and the hydrolysis reactor 903. These zone is maintained typically at 55 psia.

A second pressure controlled zone is achieved through back pressure regulator 919. The pressurized zone extends from the hydrolysis reactor outlet to the HT phase separator 913, through conduits 915, and heat exchanger conduits within 918. The pressure in this zone is controlled between 0 psig and 200 psig depending on the reaction conditions. For example, setting this zone to a higher pressure improves borate solubility. Pressure in this zone settings may be varied via 919 in relation to the reactor preheat temperature to achieve optimal hydrolysis reactor conditions.

Another pressure controlled zone comprises the LT phase separator 920 and the hydrogen accumulator 921 and associated conduits. The pressure is controlled in a suitable range for delivery to the fuel cell 923.

Figure 18:
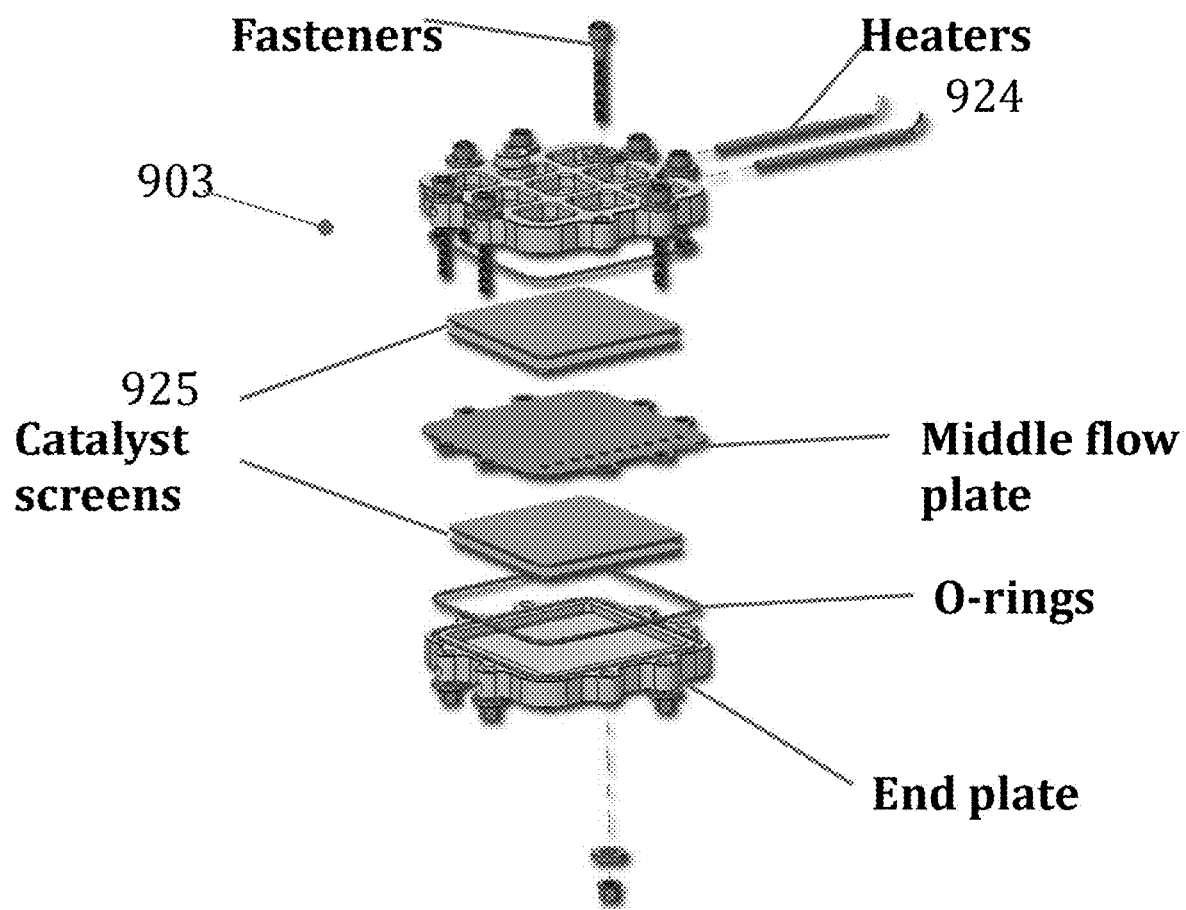
FIG. 18 shows an example of a reactor design for generating $H_2$ for use with the present invention.

Catalytic Reactor. The $H_2$ production reactor 903 is a flow-through single pass design with unidirectional internal fluid flow, achieving continuous hydrogen output. The reactor design is given in FIG. 18. Light-weight design features are included. The middle screens hold the hydrolysis catalyst material 925. The number of screens can vary from 6 to 60. Cartridge heaters allow temperature management and contribute to rapid start up 924. There are 4 heaters (50 W capacity) total, with 2 heaters inside each end plate. The reactor can be heated to 60° C. in <2 minutes. The reactor's operation conditions require precise parameter control as described herein especially with regard to preheating of the reactor and reactor pressure.

The hydrolysis catalysts include a high surface area coating of cobalt-boride on the expanded metal screen packages. The screen coating procedure first requires sonication for 30 minutes to remove any dirt and oil. After rinse the screens with large amounts of DI water, they are soaked in a Woods Nickel Bath for at least 15 minutes. While the packages are soaking, prepare the cobalt chloride solution. Move the Woods Nickel Bath to the 2 L beaker and add a counter electrode connected to a cathode power supply clip. Nickel plate the packages at 2.0V for 8 seconds on each face. Thoroughly rinse off the plating solution from. Once the Cobalt Chloride solution has sat for 10 minutes, pour enough solution over the packages to half cover the top package with the plastic container tilted to keep the solution in the package corner. Slosh the solution to ensure that there are no pockets of DI water with no cobalt in it. Pour ⅓ to ½ as much of the $NaBH_4$ solution onto the screens as the Cobalt Chloride Solution. Slosh the solution around, making sure to keep the packages covered with the solution, until bubble formation stops. Rinse with DI water. Repeat several times in such a way that the packages have been plated with the following sequence: nickel, cobalt, cobalt, nickel, cobalt, cobalt, nickel. The two later nickel coats improve the adhesion of the cobalt and keep it from being torn off during use. The packages should now be black and slightly fuzzy. Dry, wrap each package with a chem-wipe and store them in a plastic bag until they are used. Rough handling can break off the coating.

The reactor is designed and operated to achieve 100% hydrogen conversion. Conversion percentages are calculated by comparing the total amount of $H_2$ produced through the duration of a test (according to a mass flow meter) against the theoretical amount of hydrogen available from the volume of $NaBH_4$ which was supplied to the reactor during a defined operation time, using Eq 1. for stoichiometry values required for the calculation. The reactor as described herein provides a means for >95% and preferably 99.0 to 100.0% conversion, which means the reactor can achieve zero $NaBH_4$ or near zero $NaBH_4$ in the reactor output stream. Another feature of the reactor is operation without formation of crystal (insoluble) $NaBH_4$ or $NaBO_2$ within the hydrogen production catalytic reactor or adjacent fluid conduits. Included in the design are pressure sensing and pressure control at designated points in the flow system. Cooling of the catalytic reactor is achieved through the control architecture, by adjusting fluid flow rate through the reactor. Temperature sensing and control equipment items are included in the catalytic reactor design. Pressure and sensor controls are used in conjunction with the variables described above to achieve conditions of temperature and pressure, affecting water availability, and improving the solubility of $NaBO_2$ in the reactor and associated fluid conduits.

Figure 19:
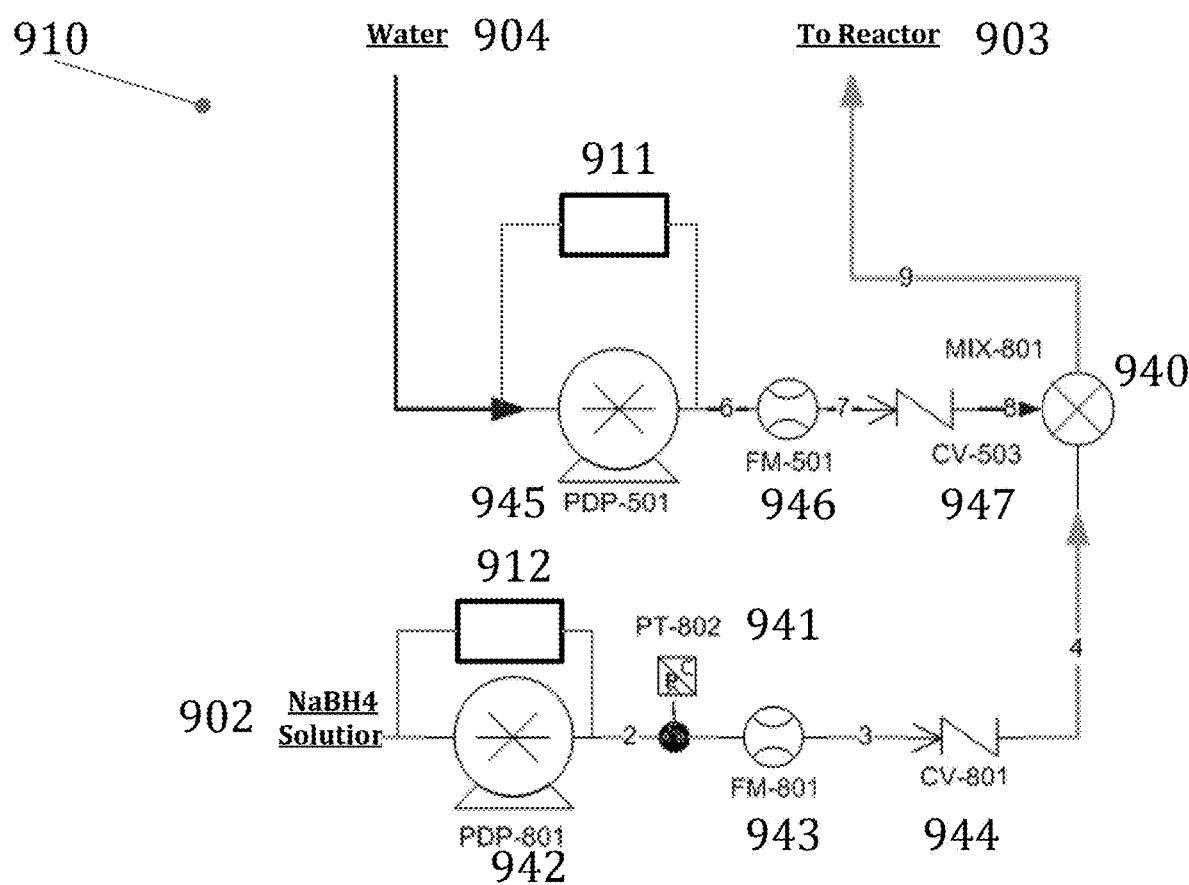
FIG. 19 shows an example of a fluid management between fuel/water storage and hydrolysis reactor via the conduit system for use with the present invention.

Fuel Management. Details of fluid management between fuel/water storage and hydrolysis reactor via the conduit system 910 are given in FIG. 19. A mixing zone 940 allows adequate dilution of the fuel from its storage concentration to its use concentration. As the fuel and water pumps ramp up and down during operation, the ratio of fuel to water will vary. The purpose of the mixing chamber is to provide a buffer for any abrupt changes in concentration that may occur. The system is preferably controlled at a concentration less than 12% $NaBH_4$. Assuming that all points in the reactor are at temperatures greater than 23° C., 12% can be a safe upper limit to prevent formation of $NaBO_2$ solids in the reactor. Because the flow rates can change abruptly during pressure on demand operation of the system, having this buffer volume to dilute any momentary or periodic changes in concentration protects the reactor from conditions, which could affect solubility. Fuel flow rate is controlled by the feedback from a pressure transducer 941. Pressure transducer can be located at any position between the fuel solution reservoir 902 and reactor 903. The pressure transducer may be in close proximity to the mixing zone 940. Goal is to maintain an accumulated pressure of 55 psia at pressure transducer 941. The conduit between the fuel reservoir and the mixing zone 940 can include a bypass valve 912, pump 942, flow meter 943, check valve 944. The conduit between the water reservoir 904 and the mixing zone 940 can include a bypass valve 911, pump 945, flow meter 946, and a check valve 947.

Because this is a pressure on demand system, but there is a slight delay between the fuel flow rate and hydrogen generation, an accumulator volume 921 was added after the low temperature phase separator 920. As the demand for hydrogen fluctuates up and down, the accumulated volume provides a consistent supply of hydrogen pressure for the fuel cell. The pressure in the accumulator 921 is monitored by pressure transducer 926 and maintained in the range of 35-75 psia by increasing or decreasing the flow rate of the fuel solution into the reactor 903 via fuel pump 924. Pressure transducer 926 is in communication with accumulator volume 921. The lower pressure limit (35 psia) ensures that the pressure always stays above the pressure required by the fuel cell 923. A typical pressure required by the hydrogen feed to the fuel cell is 25 psi. The accumulator helps to ensure the fuel cell is never starved of sufficient hydrogen. The upper limit of 75 psia prevents excessive production of hydrogen and risk of over pressurization of the system.

The control scheme ramps the fuel pump 942 up if pressure monitored by 926 falls below 55 psia so that hydrogen generation can keep up with the fuel cell's hydrogen demand. The fuel pump ramps down when the demand decreases and the 926 pressure rises above 55 psia, eventually shutting off the fuel pump if 75 psia is reached. The fuel pump 942 is controlled by the fuel flow rate and closed loop feedback from the fuel flow meter 943. The goal is to maintain the required fuel flow rate as indicated by the flow meter. For the optimum operation of ~10% $NaBH_4$ and water balance (made up from: H2O2 product water; fuel cell water and reactor recovered water) for a ~900 W fuel cell output, the fuel solution feed rate should be preferably at ~13 ml/min. During normal pressure on demand operation, the flow rate range will be as low as 0 ml/min (zero) when the hydrogen production should slow down or stop, and as high as ~20 ml/min when the fuel cell is at higher power, needing a high rate of hydrogen feed.

The water flow rate between reservoir 904 and mixing zone 940, is directly correlated to the fuel flow rate in order to maintain a $NaBH_4$ concentration entering reactor 903 at <12% for solubility protection and >8% so that water balance is maintained in a desirable range, such that the level of water in 904 is neither depleted or accumulated to excess. To achieve a desired level of water in the reservoir, the water flow rate between 904 and 940 is also controlled by feedback from the water reservoir electronic level sensor. The reservoir electronic level sensor provides feedback to pump 945 enabling the pumping rate to be adjusted. The goal is to maintain a reservoir water level at or near to a set volume. Because this measurement has direct correlation to the water balance, if all the systems are functioning optimally, the water level should be maintained at or near a constant level. However, slight deviations from a completely balanced system could compound over long term operation and the water reservoir could deplete or overfill. If low water level is detected by the electronic sensor, there is a need to avoid the water pump being starved of supply and the fuel solution not being sufficiently diluted. Thus, the control scheme operates according to the electronic level sensor. The control scheme decreases the water flow rate via pump 945 so that the water consumption is slower while the input water to the reservoir (from: oxidizer product water; fuel cell water; reactor recovered water) replenishes the reservoir to the desired level. If the level is rising, the water flow rate via pump 945 is increased to prevent overflow of the reservoir. For a fuel cell operating at ~900 W, a preferred $NaBH_4$ concentration entering the reactor is ~10% $NaBH_4$ (the storage concentration of $NaBH_4$ fuel is 25%). The flow rate into the reactor is ~23 ml/min. The fuel flow rate between 902 and 940 can be as low as 0 ml/min when hydrogen demand decreases or as high as ~30 ml/min when hydrogen demand is high.

Water flow rate from 904 to the reactor 903 via 940 is also preferably high when the reactor is being shut down. During shut down, the fuel pump 942 is turned off and water is used to flush the reactor of residual fuel solution as well as cool the reactor to room temperature.

Figure 20A:
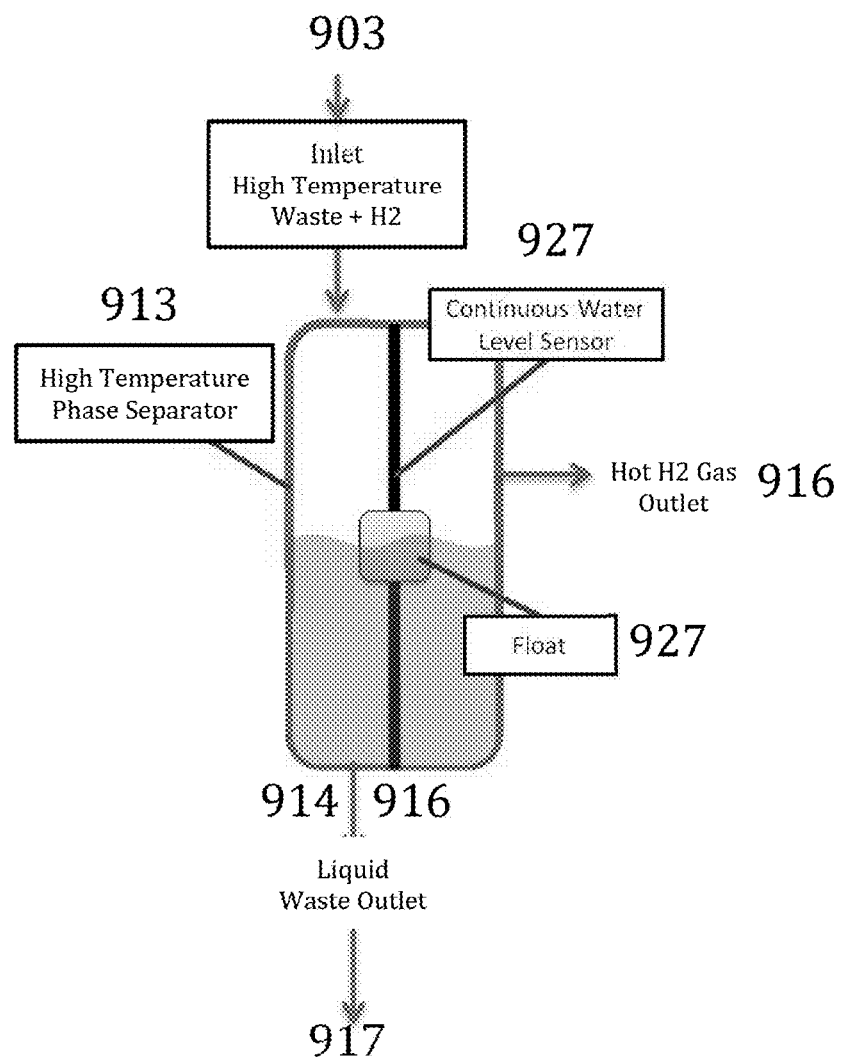
FIG. 20A shows an example of a reactor water recovery by phase separation of the present invention.

Reactor Water Recovery by Phase Separation. FIG. 20A is the configuration of the first stage high temperature phase separator 913. This high temperature phase separator has the inlet from 903 above the water line. The temperature of the hydrogen containing gas/fluid from reactor 903 is typically 110-130° C. The liquid waste is separated from the gas stream by gravity and the gas stream continues downstream via conduit 915 to the heat exchanger 918. The liquid waste in the separator typically is at 90° C. The liquid waste is transferred to waste bladders 917 described elsewhere in this application. According to the control scheme, the drain valve 916 opens once the water level in the separator reaches a predetermined point. The water level in the separator chamber is monitored by a continuous operating electronic sensor. A float-type sensor may be used 927.

Figure 20B:
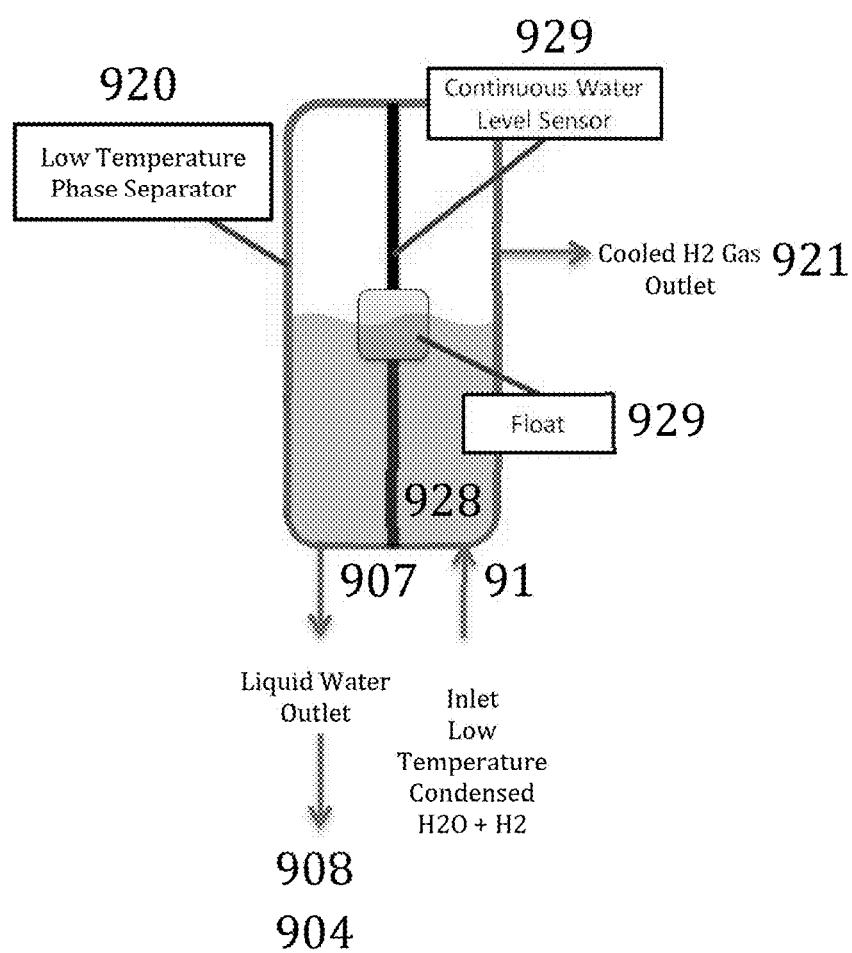
FIG. 20B shows an example of a reactor water recovery by phase separation of the present invention.

The gas stream exits the heat exchanger 918, it continues to the low temperature separator 920 where the condensed water is separated from the hydrogen-containing gas stream. FIG. 20B gives the configuration of the low temperature phase separator. The condensed water from 920 is recovered via 907 and 908 and fed to the water reservoir 904. In addition to capturing condensed water, the separator also captures micro particles in the stream by using a sparger to divide the stream into small bubbles, which pass through liquid water in the separator. In order to incorporate the sparger into the separator 928, the separator body is configured so that the inlet will remain below the water line and a stainless steel filter is fitted into the inlet. According to the control scheme, the drain valve 907 opens once the water level in the separator reaches a predetermined set point. The water level in the separator chamber is monitored by an electronic sensor. A float-type sensor may be used 929.

Figure 21A:
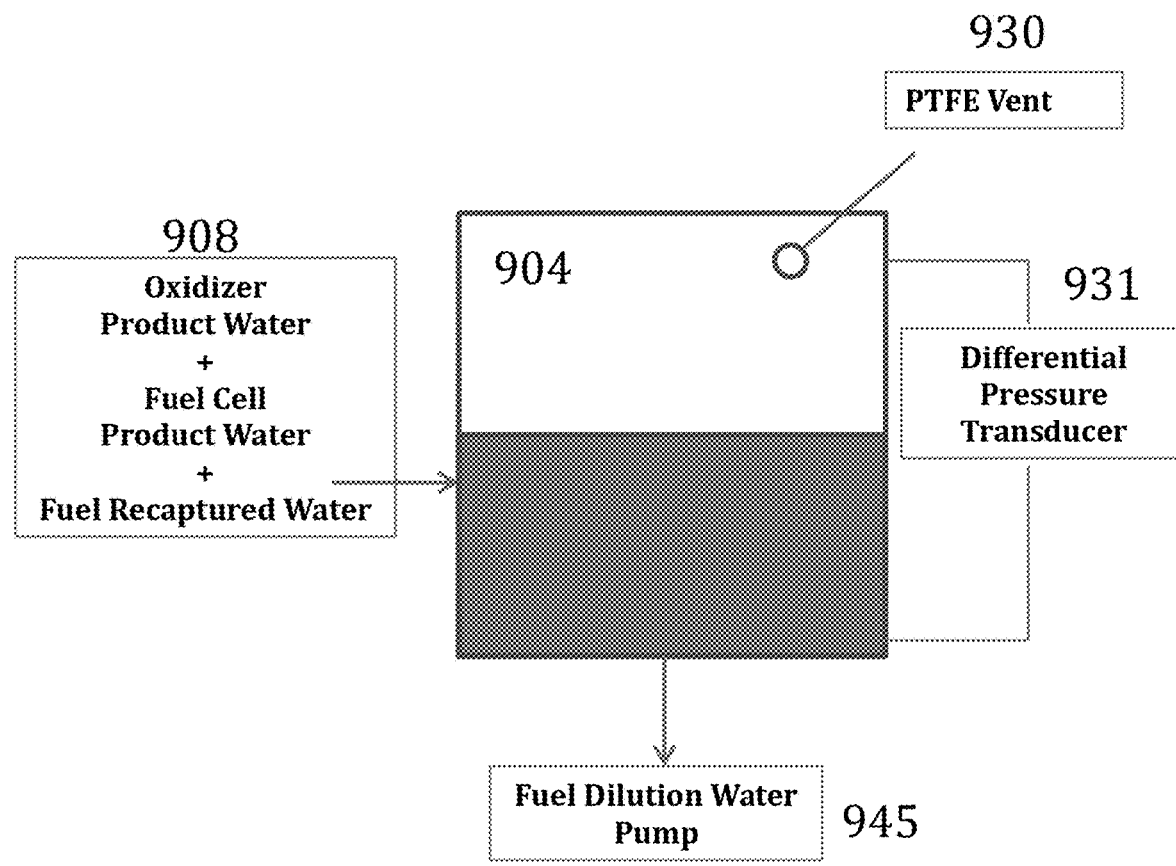
FIG. 21A shows an example of a water reservoir system for use with the present invention.
Figure 21B:
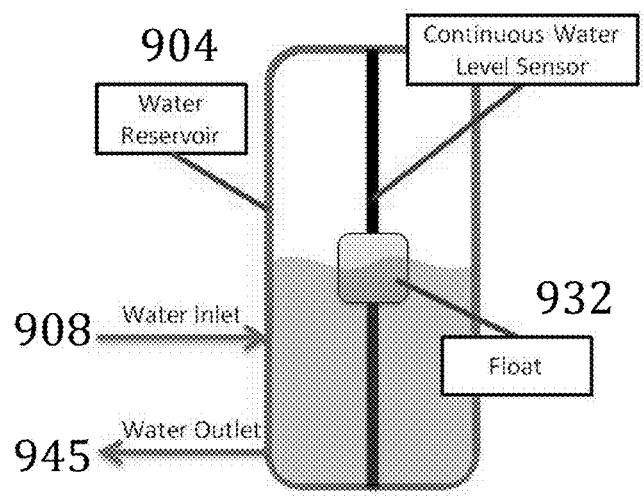
FIG. 21B shows an example of a float type continuous level sensor for use with the present invention.

Water Reservoir. FIG. 21A shows the design of the water reservoir 904 and the means of water recovery. The byproduct water from the oxidizer, fuel cell, and the recovered water reactor will fill the water reservoir, following which the water will be used to supply the fuel dilution water pump 945. The reservoir will also be vented with a Gore brand PTFE membrane which allows gas to flow freely in and out of the reservoir while preventing liquid from exiting the reservoir 930. This will allow the container to remain unpressurized throughout the duration of the mission. Furthermore, a differential pressure transducer 931 will be used in order to determine the difference between the water column pressure at the bottom of the reservoir and the pressure in the headspace of the reservoir, and the differential pressure will be used to calculate the water level. Alternatively a float type continuous level sensor 932 can be used to increase reliability and make the level sensing more robust see FIG. 21B. Under ideal conditions, the water level in the reservoir should not fluctuate, but if the water level is rising or falling over time, the water pump will slightly ramp up or down to account for minor differences that may occur between the inlet and outlet flow rates. This will help to eliminate an excessively low water level which would deprive the dilution pump or a high water level which could pressurize the container and lead to failure.

Example 1 includes one set of operating conditions and parameters for the continuous $H_2$ generating system.

EXAMPLE 1

| INPUT TO REACTOR | |
| --- | --- |
| $NaBH_4$ storage concentration | 25 wt % |
| $NaBH_4$ flow rate | ~13 mL/min |
| $H_2O$ flow rate | ~23 mL/min |
| $NaBH_4$ feed concentration | ~10 wt % |

-continued

| REACTOR CONDITIONS | |
|---|---|
| Temperature | 125° C. |
| Pressure | 75 psia |
| Insoluble NaBO$_2$ formation | No |
| Insoluble NaBH$_4$ | No |
| Residence time | ~17 s |
| OUTPUT FROM REACTOR | |
| H$_2$ flow rate | ~8.0 slpm |
| H$_2$ purity | 99.999% |
| H$_2$ conversion | 100% |
| Insoluble NaBO$_2$ | No |
| NaBH$_4$ output concentration | <0.05 wt % |
| NaBO$_2$ output concentration | 17.3 wt % |

Example 2 includes another set of operating conditions and parameters for the continuous H$_2$ generating system. In this configuration the reactor can be operated with no pre-heating but pressurized.

| REACTOR CONTROLS | |
|---|---|
| Reactor Inlet Feed Temperature | 20 C. |
| Reactor Back Pressure Control | 60 psig |
| NaBH$_4$ feed concentration | 10 wt % |
| RESULTANT OPERATIONAL CONDITIONS | |
| Reactor Outlet Temperature | 114 C. |
| Outlet Water Vapor Quality | 10% |
| NaBO$_2$ concentration | 19 wt % |
| NaBO$_2$ Solubility | 21 wt % |
| Insoluble NaBO$_2$ formation | No |

Example 3 shows some of the values for preheating temperature and low values for the back pressure setting leads to borate insolubility. In this configuration the reactor can be operated with no pre-heating or pressure.

| REACTOR CONTROLS | |
|---|---|
| Reactor Inlet Feed Temperature | 20 C. |
| Reactor Back Pressure Control | 0 psig |
| NaBH$_4$ feed concentration | 10 wt % |
| RESULTANT OPERATIONAL CONDITIONS | |
| Reactor Outlet Temperature | 79 C. |
| Outlet Water Vapor Quality | 18% |
| NaBO$_2$ concentration | 21 wt % |
| NaBO$_2$ Solubility | 21 wt % |
| Insoluble NaBO$_2$ formation | Yes |

Examples 4 includes another set of operating conditions and parameters for the continuous H$_2$ generating system when the concentration of NaBH$_4$ entering the hydrolysis reactor 20 wt %. With high NaBH$_4$ inlet concentrations, both pre-heating and an increase in pressure are needed. In this configuration the reactor can be operated with pre-heating and pressurization.

| REACTOR CONTROLS | |
|---|---|
| Reactor Inlet Feed Temperature | 70 C. |
| Reactor Back Pressure Control | 200 psig |
| NaBH$_4$ feed concentration | 20 wt % |
| RESULTANT OPERATIONAL CONDITIONS | |
| Reactor Outlet Temperature | 166 C. |
| Outlet Water Vapor Quality | 54 wt % |
| NaBO$_2$ concentration | 55 wt % |
| NaBO$_2$ Solubility | 56 wt % |
| Insoluble NaBO$_2$ formation | No |

Example 5 shows another embodiment of operating conditions. Preheating is applied but the back pressure regulator is set at a low pressure. These conditions in borate insolubility. In this configuration the reactor can be operated with pre-heating but not pressurized.

| REACTOR CONTROLS | |
|---|---|
| Reactor Inlet Feed Temperature | 70 C. |
| Reactor Back Pressure Control | 0 psig |
| NaBH$_4$ feed concentration | 20 wt % |
| RESULTANT OPERATIONAL CONDITIONS | |
| Reactor Outlet Temperature | 85 C. |
| Outlet Water Vapor Quality | 77 wt % |
| NaBO$_2$ concentration | 71 wt % |
| NaBO$_2$ Solubility | 56 wt % |
| Insoluble NaBO$_2$ formation | Yes |

Example 6 shows yet another set of operating conditions. It uses a NaBH$_4$ entering the hydrolysis reactor 20 wt %. The backpressure control is set at a high value. However, the inlet temperature is set at a low value. These conditions result in borate insolubility. In this configuration the reactor can be operated with no pre-heating but pressurized.

| REACTOR CONTROLS | |
|---|---|
| Reactor Inlet Feed Temperature | 20 C. |
| Reactor Back Pressure Control | 200 psig |
| NaBH$_4$ feed concentration | 20 wt % |
| RESULTANT OPERATIONAL CONDITIONS | |
| Reactor Outlet Temperature | 160 C. |
| Outlet Water Vapor Quality | 41 wt % |
| NaBO$_2$ concentration | 49 wt % |
| NaBO$_2$ Solubility | 21 wt % |
| Insoluble NaBO$_2$ formation | Yes |

Example 7 includes another set of operating conditions and parameters for the continuous H$_2$ generating system when the concentration of NaBH$_4$ entering the hydrolysis reactor 10 wt %. In this configuration the reactor can be operated with pre-heating but not pressurized.

| REACTOR CONTROLS | |
|---|---|
| Reactor Inlet Feed Temperature | 30 C. |
| Reactor Back Pressure Control | 0 psig |
| NaBH$_4$ feed concentration | 10 wt % |
| RESULTANT OPERATIONAL CONDITIONS | |
| Reactor Outlet Temperature | 80 C. |
| Outlet Water Vapor Quality | 20 wt % |
| NaBO$_2$ concentration | 21 wt % |
| NaBO$_2$ Solubility | 26 wt % |
| Insoluble NaBO$_2$ formation | No |

Figure 22A:
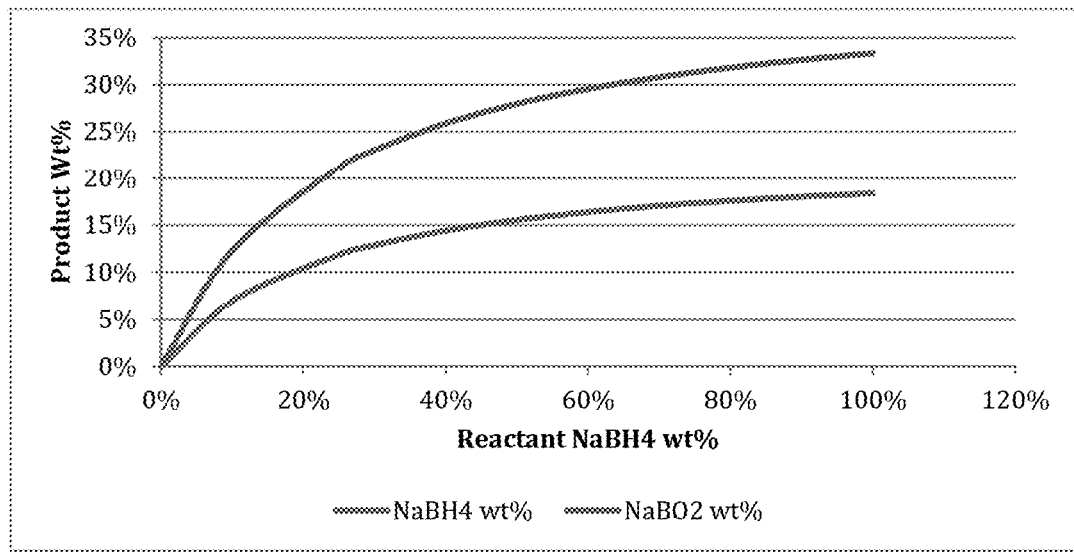
Figure 22B:
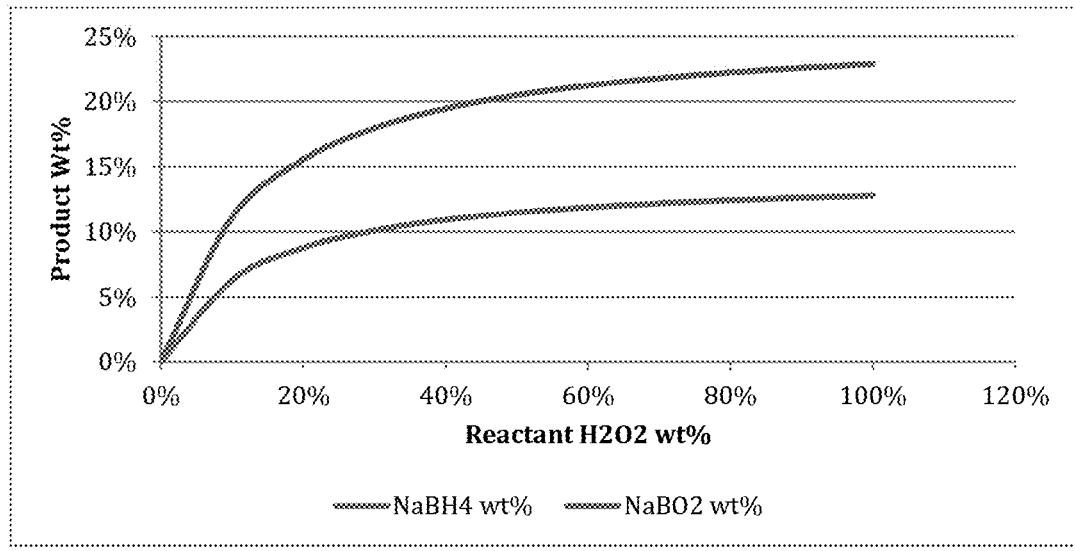

FIGS. 22A and 22B are graphs that show the product as a weight percent wt % of the NaBH$_4$ and NaBO$_2$, in relation to: FIG. 22A the wt % of reactant NaBH$_4$, and in FIG. 22B the wt % of the reactant H$_2$O$_2$.

Figure 23:
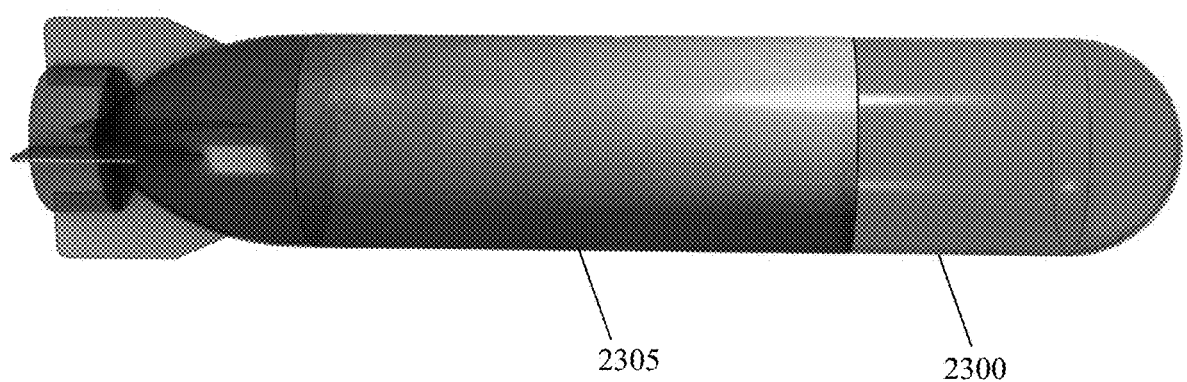
FIG. 23 shows an underwater vehicle comprising an underwater vehicle power unit.

FIG. 23 shows an underwater vehicle 2300 comprising an exemplary embodiment of the present invention, the underwater vehicle power unit 2305, comprising a fuel and waste stack comprising one or more reactant or fuel storage bladders and one or more waste storage bladders; a heater that pre-heats at least one of a fuel or a reactant prior to entering a reactor, wherein the reactor generates hydrogen and waste; a hydrogen and waste separator, wherein the waste is stored in the one or more waste storage bladders and the waste does not form crystals by controlling at least one of the dilution in water, pressure, or temperature of the waste; a heat exchanger that cools the hydrogen; a back-pressure regulator that maintains a pressure in the reactor and an elevated temperature to prevent precipitation of the waste; a hydrogen and liquid separator, wherein the liquid is stored in a reservoir; a fuel cell capable of generating an electrical current when exposed to hydrogen; and a controller that controls the temperature of the heater, the flow of fuel into the reactor, the flow of hydrogen into the fuel cell, the flow of water that dilutes the fuel, and the flow of waste from the reactor and/or the fuel cell into the one or more waste storage bladders.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. An underwater vehicle power unit comprising:
a fuel and waste stack comprising one or more reactant or fuel storage bladders and one or more waste storage bladders;
a heater that pre-heats at least one of a fuel or a reactant prior to entering a reactor, wherein the reactor generates hydrogen and waste;
a hydrogen and waste separator, wherein the waste is stored in the one or more waste storage bladders and the waste does not form crystals by controlling at least one of the dilution in water, pressure, or temperature of the waste;
a heat exchanger that cools the hydrogen;
a back-pressure regulator that maintains a pressure in the reactor and an elevated temperature to prevent precipitation of the waste;
a hydrogen and liquid separator, wherein the liquid is stored in a reservoir;

a fuel cell capable of generating an electrical current when exposed to hydrogen; and a controller that controls the temperature of the heater, the flow of fuel into the reactor, the flow of hydrogen into the fuel cell, the flow of water that dilutes the fuel, and the flow of waste from the reactor and/or the fuel cell into the one or more waste storage bladders.

2. The power unit of claim 1, wherein the back-pressure regulator maintains a pressure in the reactor regardless of flow rate or $H_2$ production rate, reducing the concentration of the byproduct, or $NaBO_2$.

3. The power unit of claim 1, wherein the fuel reactor and an oxygen generator operate under adiabatic conditions.

4. The power unit of claim 1, further comprising one or more pumps and valves between the one or more fuel storage bladders, the reactor, the fuel cell, or the one or more waste bladders controlled by the controller and that manage the flow of fuel, hydrogen, and waste.

5. The power unit of claim 1, further comprising a water recirculation system connected to the fuel cell, wherein water generated from the fuel cell is used to at least one of cool the reactor or fuel cell, or dilute a fuel.

6. The power unit of claim 1, further comprising a battery that powers one or more pumps and valves when the fuel cell is not generating an electrical current.

7. The power unit of claim 1, further comprising one or more heat sources at one or more cold spots between the reactant or fuel storage bladders and waste storage bladders to prevent precipitation of reactants, byproducts, and/or waste in the power unit.

8. The power unit of claim 1, wherein a reactant for use in the fuel cell system is a metal-hydride.

9. The power unit of claim 1, wherein a reactant for use with the present invention is selected from at least one of $NaBH_4$, $LiBH_4$, $KBH_4$, $Ca(BH_4)_2$, or $Mg(BH_4)_2$.

10. The power unit of claim 1, further comprising one or more heat sinks in communication with at least one of the heat exchanger, the one or more fuel storage bladders, the reactor, the fuel cell, or the one or more waste bladders.

11. The power unit of claim 10, wherein the heat sink surrounds at least one of the one or more fuel storage bladders, the reactor, the fuel cell, or the one or more waste bladders.

12. The power unit of claim 1, wherein an oxidizer is further defined as comprising a peroxide pump, a flow meter, a heat exchanger, a back pressure regulator, a phase separator, an accumulator and a forward pressure regulator.

13. The power unit of claim 12, further comprising a back-pressure regulator between the oxidizer and the fuel cell.

14. A method of powering an underwater vehicle with a power unit comprising:

providing a fuel and waste stack comprising one or more reactant or fuel storage bladders and one or more waste storage bladders;

pre-heating at least one of a fuel or a reactant prior to entry into a reactor;

injecting the pre-heated fuel or the reactant into the reactor to generate hydrogen;

connecting the one or more fuel storage bladders, the reactor, a fuel cell, or the one or more waste bladders to a heat exchanger;

controlling at least one of a dilution in water, a pressure, or a temperature of a waste stream to prevent crystallization of the waste in the reactor;

connecting the output from the reactor to the fuel cell capable of generating an electrical current when exposed to hydrogen; and connecting a controller that controls the heater, the flow of fuel to the reactor, the flow of hydrogen to the fuel cell, the flow of waste from the reactor and/or the fuel cell to the one or more waste storage bladders.

15. The method of claim 14, wherein the back-pressure regulator maintains a pressure in the reactor regardless of flow rate or $H_2$ production rate, reducing the concentration of the byproduct, or $NaBO_2$.

16. The method of claim 14, wherein at least one of the heater, the heat-exchanger, or the back-pressure regulator are operated to maintain a reactor byproduct fully soluble at localized cold spots during startup and steady state operation.

17. The method of claim 14, further comprising providing one or more pumps and valves between the one or more fuel storage bladders, the reactor, the fuel cell, or the one or more waste bladders controlled by the controller and that manage the flow of fuel, hydrogen, and waste to maintain the underwater vehicle gravimetrically balanced during dive or surfacing operations.

18. The method of claim 14, further comprising connecting a water recirculation system connected to the fuel cell, wherein water generated from the fuel cell is used to at least one of cool the reactor or fuel cell, or dilute a fuel.

19. The method of claim 14, further comprising providing a battery that powers one or more pumps and valves when the fuel cell is not generating an electrical current.

20. The method of claim 14, further comprising providing one or more heat sources at one or more cold spots between the reactant or fuel storage bladders and waste storage bladders to prevent precipitation of reactants, byproducts, and/or waste in the power unit.

21. The method of claim 14, wherein a reactant for use in the fuel cell system is a metal-hydride.

22. The method of claim 14, wherein a reactant for use with the present invention is selected from at least one of $NaBH_4$, $LiBH_4$, $KBH_4$, $Ca(BH_4)_2$, or $Mg(BH_4)_2$.

23. The method of claim 14, further comprising providing one or more heat sinks in communication with the at least one of the one or more fuel storage bladders, the reactor, the fuel cell, or the one or more waste bladders.

24. The method of claim 23, wherein the heat sink surrounds at least one of the one or more fuel storage bladders, the reactor, the fuel cell, or the one or more waste bladders.

25. The method of claim 14, wherein an oxidizer is further defined as comprising a peroxide pump, a flow meter, a heat exchanger, a back pressure regulator, a phase separator, an accumulator and a forward pressure regulator.

26. The method of claim 25, further comprising providing a back-pressure regulator between the oxidizer and the fuel cell.

* * * * *